United States Patent [19]

Koide et al.

[11] Patent Number: 4,574,369

[45] Date of Patent: Mar. 4, 1986

[54] TRACKING/FOCUSING DEVICE FOR POSITIONING AN OPTICAL LENS UNIT

[75] Inventors: Hiroshi Koide, Sagamihara; Junichi Watanabe, Kawasaki; Shigemoto Tenmyo, Tokyo, all of Japan

[73] Assignee: Ricoh Co., Ltd., Tokyo, Japan

[21] Appl. No.: 461,741

[22] Filed: Jan. 28, 1983

[30] Foreign Application Priority Data

| Jan. 28, 1982 | [JP] | Japan | 57-12143 |
| May 28, 1982 | [JP] | Japan | 57-90956 |
| May 31, 1982 | [JP] | Japan | 57-91472 |
| May 31, 1982 | [JP] | Japan | 57-98638 |
| Jun. 9, 1982 | [JP] | Japan | 57-99042 |
| Jun. 10, 1982 | [JP] | Japan | 57-99586 |

[51] Int. Cl.⁴ .............. H04N 5/781; G11B 7/00; G11B 21/00
[52] U.S. Cl. .................................. 369/44; 369/45; 250/201
[58] Field of Search .......... 369/45, 47, 46, 44, 369/43; 250/201 DF

[56] References Cited

U.S. PATENT DOCUMENTS

| 4,021,101 | 5/1977 | Camerik | 369/45 |
| 4,193,091 | 3/1980 | Kleuters et al. | 369/45 |
| 4,408,313 | 10/1983 | Musha | 369/45 |
| 4,482,988 | 11/1984 | Tsurushima et al. | 369/44 |

FOREIGN PATENT DOCUMENTS

| 5523835 | 9/1981 | Japan | 369/45 |
| 5664144 | 11/1982 | Japan | 369/44 |

*Primary Examiner*—Robert L. Richardson
*Attorney, Agent, or Firm*—Guy W. Shoup

[57] ABSTRACT

An optical disc player/recorder includes a composite coil device for controlling both tracking and focusing functions of a moveable objective lens unit. A bobbin having orthogonal coils is supported by spring members and holds the objective lens. A magnetic gap field intersects both coils and current through each controls the focusing position and tracking position of the lens.

6 Claims, 65 Drawing Figures

Fig. 1 PRIOR ART
Fig. 2 PRIOR ART
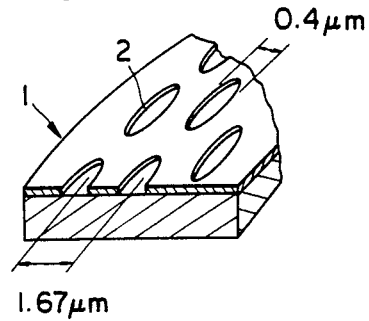
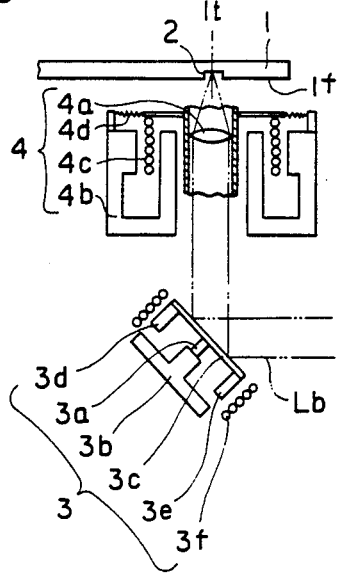
Fig. 3 PRIOR ART
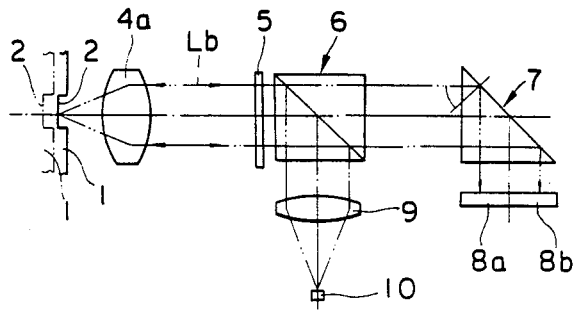
Fig. 4
Fig. 5
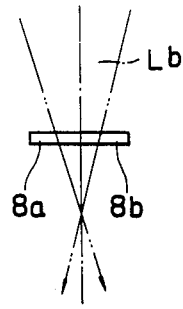
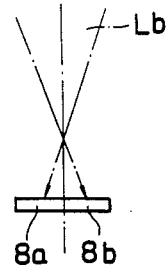

TRACKING/FOCUSING DEVICE FOR POSITIONING AN OPTICAL LENS UNIT

BACKGROUND OF THE INVENTION

1. Field of the Invention

This invention relates to an optical recording and/or reading apparatus, and, in particular, to such an optical recording and/or reading apparatus which is used in an optical type disc information recording/reading system in which information is optically recorded onto or read off of a recording disc such as an optical video disc. More specifically, the present invention is directed to a structure for properly positioning an objective lens forming a part of such a non-contact type optical recording/reading apparatus relative to the recording surface, whereby the positioning of the lens includes proper focusing and tracking.

2. Description of the Prior Art

In a contactless recording/reading system using a laser beam, no recording grooves are formed in the surface of a recording disc, and, instead, as shown in FIG. 1, egg-shaped pits 2 are formed in the surface of a recording disc 1 and arranged circumferentially to form recording tracks. Typically, such pits 2 are only 0.1 microns deep, which is ⅛ of the wave length of the laser beam used for scanning the recording tracks. When these pits 2 are scanned by the laser beam, the reflecting light from the pits 2 is shifted in phase as compared with the reflecting light from the remaining portion of the recording surface. In this manner, the scanning laser beam may be modulated depending upon presence or absence of such a pit 2. Thus, in the read mode, such a phase shift in the laser beam is detected to reconstruct the information recorded in the recording disc 1. Accordingly, image information and sound information are all recorded in the form of pits 2 by varying their length and spacing. Typical sizes of such pits 2 are also indicated in FIG. 1.

In the case of writing information in or reading the recorded information from the recording disc 1, consideration must be given to two important factors: (1) tracking control for preventing the scanning beam deviating from the current recording track and (2) focusing control for keeping the scanning beam completely focused on the surface of the recording disc 1.

FIG. 2 shows a typical prior art optical recording/reading apparatus which, generally, includes a tracking control actuator 3 and a focusing control actuator 4. As the scanning light beam $L_b$ such as laser beam is led toward the actuator 3 as indicated by the arrows, it is reflected toward the focusing control actuator 4 where the beam passes through an objective lens 4a and is focused onto the recording surface 1f of the disc 1 in the form of a minute spot. The light beam $L_b$ is modulated in intensity at the recording surface 1f, and the thus modulated light beam is then reflected to travel the same optical path in the reversed direction, and the reflected light beam is then detected by an appropriate detector. Accordingly, such a light beam thus detected may then by demodulated to obtain video and/or audio signals.

The focusing control actuator 4 is similar in structure to the voice coil driving section of a loudspeaker. As shown, the actuator 4 includes a magnetic circuit 4b and a voice coil 4c. Since the structure and operation of a loudspeaker voice coil is well known in the art, it will be briefly described as it applies to the structure and operation of the focusing control actuator 4.

The magnet circuit 4b is comprised of a permanent magnet and soft-iron members and it is so shaped to define a gap in which the voice coil 4c is movably provided. In the gap is formed a high density magnetic flux which extends in the direction normal to the wires forming the coil 4c. The voice coil 4c is supported by a flexible member 4d such that it may move upward or downward in the vertical gap which is parallel with the optical path. Integrally provided with the voice coil 4c by means of an appropriate holder is the objective lens 4a which is thus moved upward or downward together with the voice coil 4c. When the voice coil 4c is supplied by a current which is proportional to the focusing error signal generated by a focusing error detecting system (not shown), the electromagnetic interaction between the current thus supplied and the magnetic field applied to the coil 4c causes the voice coil 4c to move in parallel with the optical path, either upward or downward depending upon the direction of the current, thereby maintaining the lens 4a in the in-focus condition.

The tracking control actuator 3 used in the apparatus of FIG. 2 is of the so-called oscillating mirror type. Stated more in detail, oscillatably mounted on a base 3b through an elastic member 3a of rubber or the like is a mirror 3c, on both ends of which are mounted magnets 3d and 3e. When current is flowed through the coil 3f, the magnets 3d and 3e are either repelled or attracted, so that the mirror 3c becomes oscillated around the elastic member 3a, thereby varying the incident angle of the light beam $L_b$ entering into the lens 4a.

In this manner, in accordance with the prior art, two separate actuators are provided, one for tracking control and the other for focusing control, as arranged spaced apart from each other along the optical path. For this reason, the prior art apparatus including the two separate actuators 3 and 4 tends to be bulky and difficult to manufacture partly because the two actuators must be aligned accurately during manufacture. Making the whole apparatus compact in size is desirable because it then allows to shorten the distance between the objective lens 4a and the light receiving element such as the recording surface 1f, which then contributes to increase the detection limit of the light receiving element. In this respect, more detailed explanation will be given hereinbelow.

In a typical prior art in-focus detecting system as shown in FIG. 3, there are provided a quarter wave plate 5, a beam splitter 6, a deflecting prism 7, a pair of light-receiving elements 8a, 8b, a coupling lens 9 and a light source 10 such as a laser diode. In the illustrated system, a focusing error is detected by the difference in amount of light received by the pair of light-receiving elements 8a and 8b which are arranged symmetrically with respect to the optical axis. Assuming that the disc 1 is located at the in-focus position, the reflecting light from the disc 1 is led as parallel light to the light-receiving elements 8a and 8b, as shown in FIG. 3. On the contrary, if the disc 1 is located far away from the focal point of the objective lens 4a, as shown by the two-dotted line in FIG. 3, then the reflecting light from the disc 1 comes to be focused behind the light-receiving elements 8a and 8b, as shown in FIG. 4; on the other hand, if the disc 1 is brought closer to the lens 4a than the local point, the reflecting light comes to be focused in front of the light-receiving elements 8a and 8b, as shown in FIG. 5. In either case, when the disc 1 tends to be located further away from the focal point of the lens 4a shown in FIG. 3 (cf. FIG. 4), the light fluxes on both sides of the optical axis maintain the same positional relation with respect to the paired light-receiving elements 8a and 8b; however, if the disc 1 tends to move closer to the lens 4a beyond the focal point, the positional relation of the light fluxes on both sides of the optical axis with respect to the light-receiving elements 8a and 8b becomes reversed (cf. FIGS. 4 and 5), so that focusing error cannot be detected by using the difference in amount of light received by the light-receiving elements 8a and 8b.

With foregoing in mind, in order to properly detect focusing error with the system such as shown in FIG. 3, it must be so structured that the light beam $L_b$ is always focused behind the light-receiving elements 8a and 8b. Under the circumstances, defining the amount of shift of the disc 1 in the direction of the optical path which satisfies the above-described condition, or the detection limit of the light-receiving elements 8a and 8b by e, it may be expressed by the following equation.

$$e = f^2/2(1-f)$$

where, f is the focal distance of the objective lens, and l is the equivalent optical path length between the objective lens and the light-receiving elements.

As may be understood from the above equation, the value of e may be increased by making the optical path length difference (1−f) smaller, indicating an increase in detection limit of the light-receiving elements.

SUMMARY OF THE INVENTION

It is a primary object of the present invention to provide an improved optical recording and/or reading apparatus.

Another object of the present invention is to provide a non-contact type recording and/or reading apparatus which is insured to maintain a desired positional relation with respect to a recording medium.

A further object of the present invention is to provide an optical recording and/or reading apparatus including an integrated position control mechanism for controlling the position of the objective lens depending upon undesired motion of its associated recording medium.

A still further object of the present invention is to provide an optical recording and/or reproducing apparatus which may be advantageously used with a recording disc on which information is recorded in the form of pit train.

A still further object of the present invention is to provide an optical recording and/or reading apparatus including an integrated position control mechanism for controlling the objective lens to be located always at the desired position with respect to a recording disc even if undesired motion is produced in the recording disc owing, for example, to eccentricity, warps and other causes such as fluctuations in rotation of the disc.

A still further object of the present invention is to provide an optical recording and/or reading apparatus which is significantly compact, in particular along its optical path, in size as compared with the prior art apparatus.

Other objects, advantages and novel features of the present invention will become apparent from the following detailed description of the invention when considered in conjunction with the accompanying drawings.

BRIEF DESCRIPTION OF THE DRAWINGS

FIG. 1 is a perspective, fragmentary view of a typical recording disc which is partly shown in cross section;

FIG. 2 is a schematic illustration showing a typical prior art optical recording and/or reading apparatus including two separate actuators for controlling the light beam to be focused at the desired location of the recording disc;

FIG. 3 is a schematic illustration showing the arrangement of a typical prior art in-focus condition detecting system;

FIGS. 4 and 5 are schematic illustrations which are useful for explaining the operation of the system of FIG. 3 in which FIG. 4 shows the out-of-focus condition because the light beam is focused behind the detector; whereas, FIG. 4 shows the out-of-focus condition because the light beam is focused in front of the detector;

DESCRIPTION OF THE PREFERRED EMBODIMENTS

Figure 6:
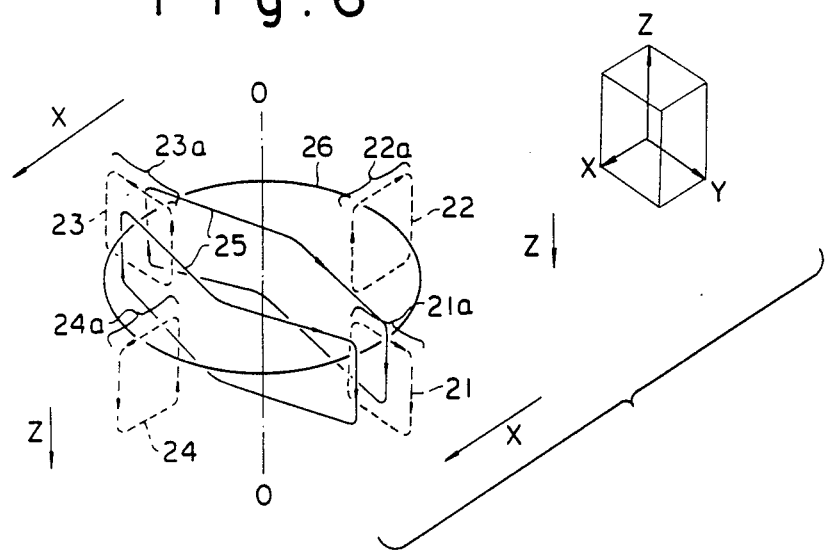
FIG. 6 is a schematic illustration showing the fundamental structure of one embodiment of the present invention.

Referring now to FIG. 6, showing the fundamental structure of one embodiment of the present apparatus, there is formed a magnetic circuit, portions of which are representatively indicated by the, dotted lines 21, 22, 23 and 24 at four sections but which in fact is continuous around the center axis O in an annular shape, and is generated by a magnetic field generating means, which will be described in detail later. There is provided a first driving coil 25 (only two coil segments are shown) such that it interacts with those portions, e.g., 21a, 22a, 23a and 24a, of the magnetic circuits, e.g., 21, 22, 23 and 24, that extend radially with respect to the center axis O. Accordingly, the illustrated segments of the first driving coil 25, for example, are so provided to intersect the top portion 21a of the magnetic circuit 21 in the Z direction and the top portion 23a of the magnetic circuit 23, which is arranged opposite to the magnetic circuit 21 with respect to the center axis O, also in the Z direction. Also provided is a second driving coil 26 defined in the form of a circle with its center located at the center axis O, and the second driving coil 26 intersects the magnetic circuits represented by 21-24 in the circumferential direction. As will become clear later, those first and second driving coils are provided on the same bobbin to define an integrated structure. It should be noted, however, that the driving current is passed independently from each other.

As shown in FIG. 6, in the case where those portions 21a-24a of the magnetic circuits 21-24 are directed in the radial direction with respect to the center axis O, if current is supplied to flow the first driving coil 25 in the clockwise direction, the first driving coil 25 together with the second driving coil 26 moves in X direction. Reversing the direction of the supplied current causes the movement in the opposite direction. On the other hand, if current is supplied to flow through the second driving coil 26 in the counterclockwise direction, the second driving coil together with the first driving coil 25 moves in Z direction; whereas, the clockwise current flow will produce the opposite movement.

Based on the above-described principle, by mounting an objective lens on the bobbin around which the first and second driving coils are wound and having the bobbin movably supported, one embodiment of the present optical recording and/or reading apparatus may be obtained. When constructed, in principle, to have the structure shown in FIG. 6, Z direction corresponds to the focusing direction and X direction corresponds to the tracking direction. With such a structure, since the first driving coil 25 for tracking control and the second driving coil 26 for focusing control are superposingly provided on the same bobbin, the apparatus as a whole may be made significantly short in length along the optical axis and thus compact in size.

Figure 7:
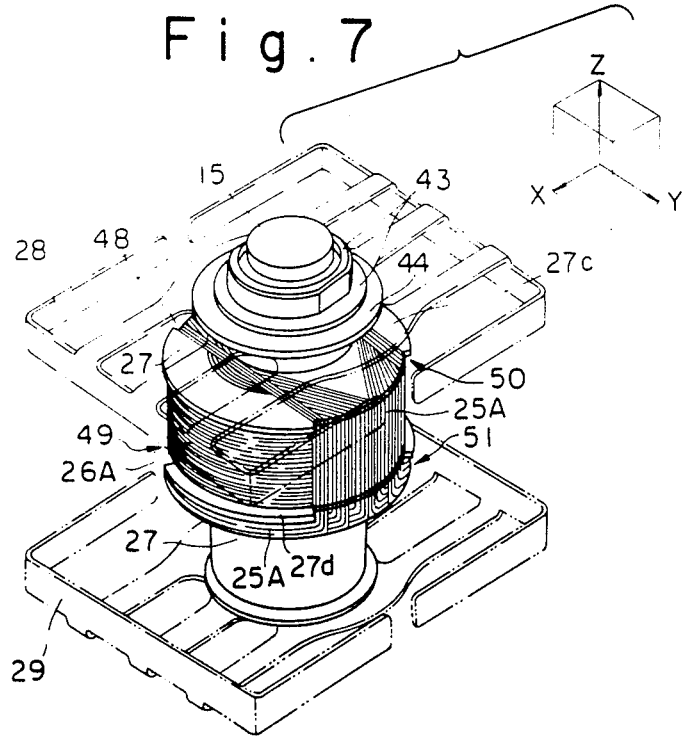
FIG. 7 is a perspective view showing the optical recording and/or reading apparatus constructed in accordance with the principle illustrated in FIG. 6.

FIG. 7 shows the optical recording and/or reading apparatus constructed in accordance with the embodiment of the present invention which has the basic structure illustrated in FIG. 6. That is, the apparatus includes the first driving coil 25A, which corresponds to the coil 25 in FIG. 6, and the second driving coil 26A, which corresponds to the coil 26 in FIG. 6. These coils 25A and 26A are wound around the same bobbin 27, which is generally in the form of a cylinder and at the top end of which is provided a lens cell 15. The top and bottom portions of the bobbin 27 are supported by top and bottom spring members 28 and 29, respectively, which, in turn, are fixedly mounted on a main body case 30. It is to be noted that in addition to the lens cell 15, one or more of the components illustrated in FIG. 3 such as a light source and light-receiving elements may also be mounted on the bobbin 27.

Figure 8:
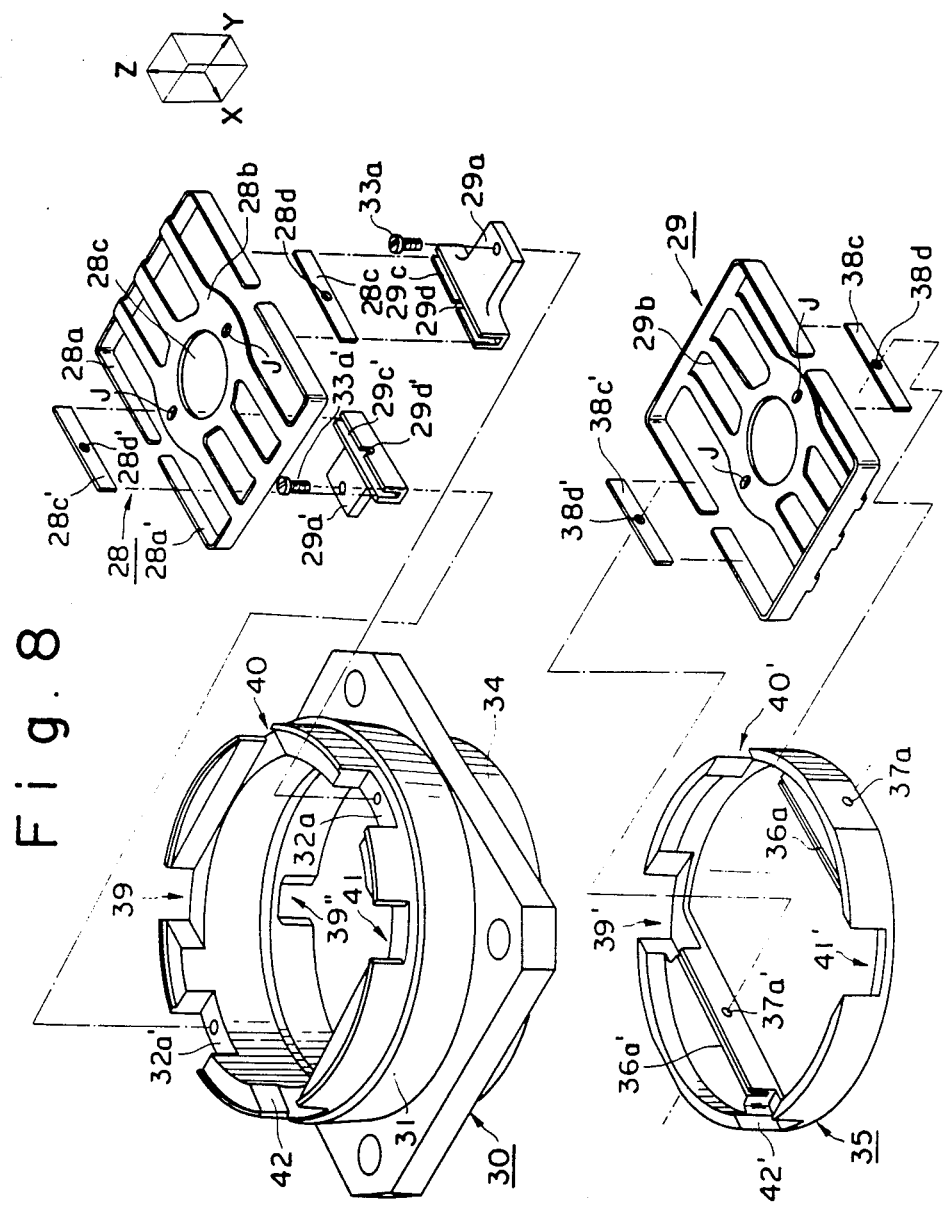
FIG. 8 is an exploded, perspective view of the apparatus shown in FIG. 7.

Referring now particularly to FIG. 8, it will be described in detail how the spring members 28 and 29 are mounted on the main body case 30. The top spring member 28 is generally in a rectangular shape and it is comprised of a pair of oppositely arranged wall sections 28a and 28a' which are integrally connected by connecting sections 28b which are so shaped to define a hall 28c at the center for having the lens cell 15 fitted therein for positioning. As shown, the wall sections extending in X direction are discontinued in the middle to form opposed free ends. Bridge plates 28c and 28c' are attached to the opposed free ends from inside as shown, and the bridge plates 28c and 28c' thus attached to the free ends of the wall sections 28a and 28a' are then fitted into the grooves 29c and 29c' formed in T-shaped intermediate support members 29a and 29a', respectively. As may be noticed, the bridge plates 28c and 28c' are each provided with small through-holes 28d and 28d', respectively, in the middle. These holes 28d and 28d' are to be used for alignment during manufacture by inserting pins each through the hole 28d or 28d' and the notch 29d or 29d' formed in the intermediate support member 29a or 29a'. As indicated by the one-dotted lines in FIG. 8, the intermediate support members 29a and 29a' are then fixed by means of screws 33a and 33a' into recesses 32a and 32a', respectively, which are formed at the top end of the upper cylinder 31 of the case 30 as aligned in Y direction.

As is obvious from FIG. 8, the bottom spring member 29 is structurally identical to the top spring member 28, but is positioned upside down. The lower cylinder 34 of the case 30 is so structured that a ring shaped flange member 35 may be fitted therein. The flange member 35 is provided with a pair of grooves 36a and 36a', which correspond in position to the grooves 29c and 29c' of the top spring member 28 when assembled. The bottom spring member 29 also includes bridge plates 38c and 38c' securely attached thereto, and thus the bottom spring member 29 may be properly positioned by having the bridge plates 38c and 38c' securely fitted into the corresponding grooves 36a and 36a' of the flange member 35. Similarly with the top spring member 28, the flange member 35 is provided with holes 37a and 37a' and the bridge plates 38c and 38c' are also provided with holes 38d and 38d', respectively, and these holes are to be used during manufacture for attaining proper alignment among the elements.

As described above, when assembled, the spring members 28 and 29 are so disposed to define a desired spacing between the respective connecting sections 28b and 29b to support the bobbin 27 therein, and, thus, it is so structured that the bobbin 27 may move not only in X direction but also in Z direction. The top end of the upper cylinder 31 is provided with four cut-away portions 39-42 corresponding in position to four corners of the top spring member 28 thereby making room for the movement of the top spring member 28 in X direction. Similarly, the flange member 35 is also provided with four cut-away portions 39'-42' for the same intended purpose.

Figure 10:
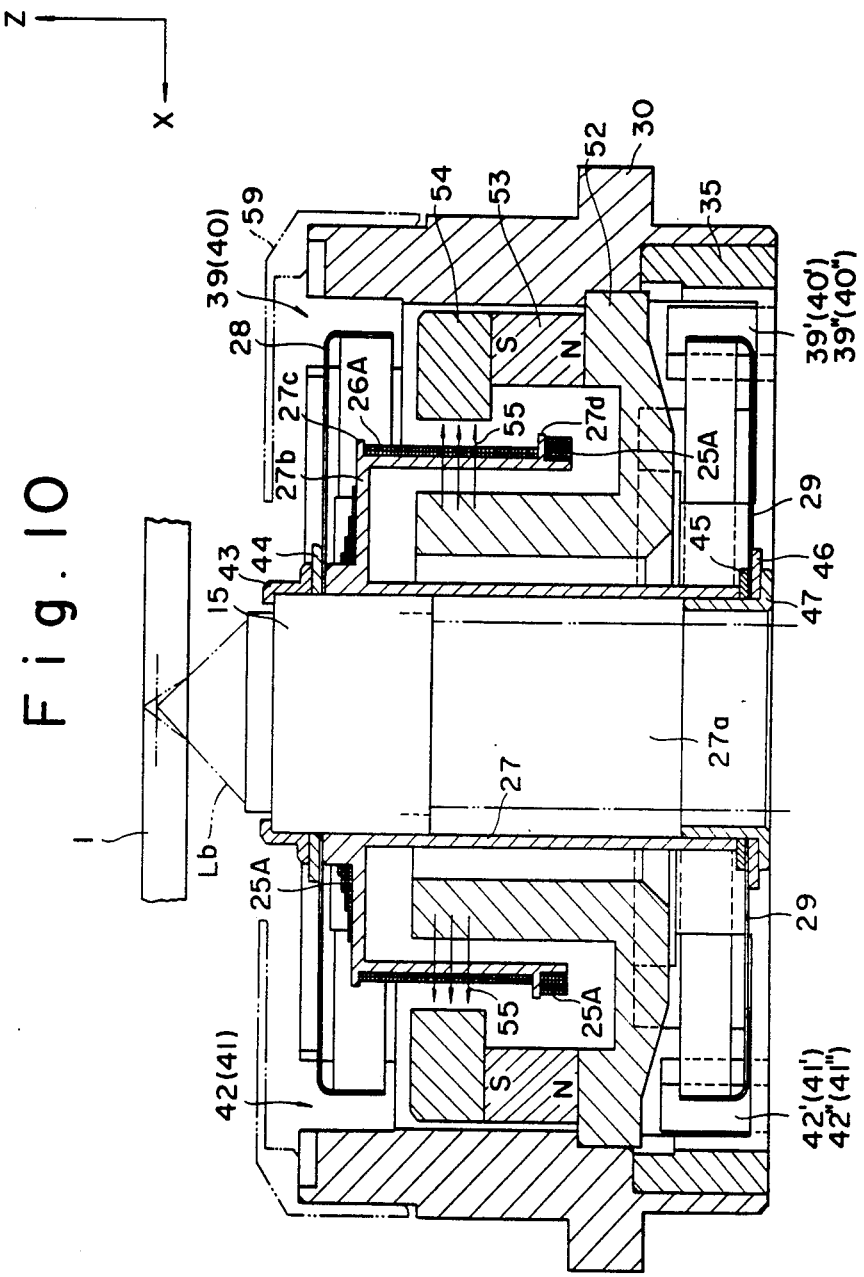
FIG. 10 is a cross sectional view of the apparatus of FIG. 7 taken along I—I line indicated in FIG. 9.
Figure 11:
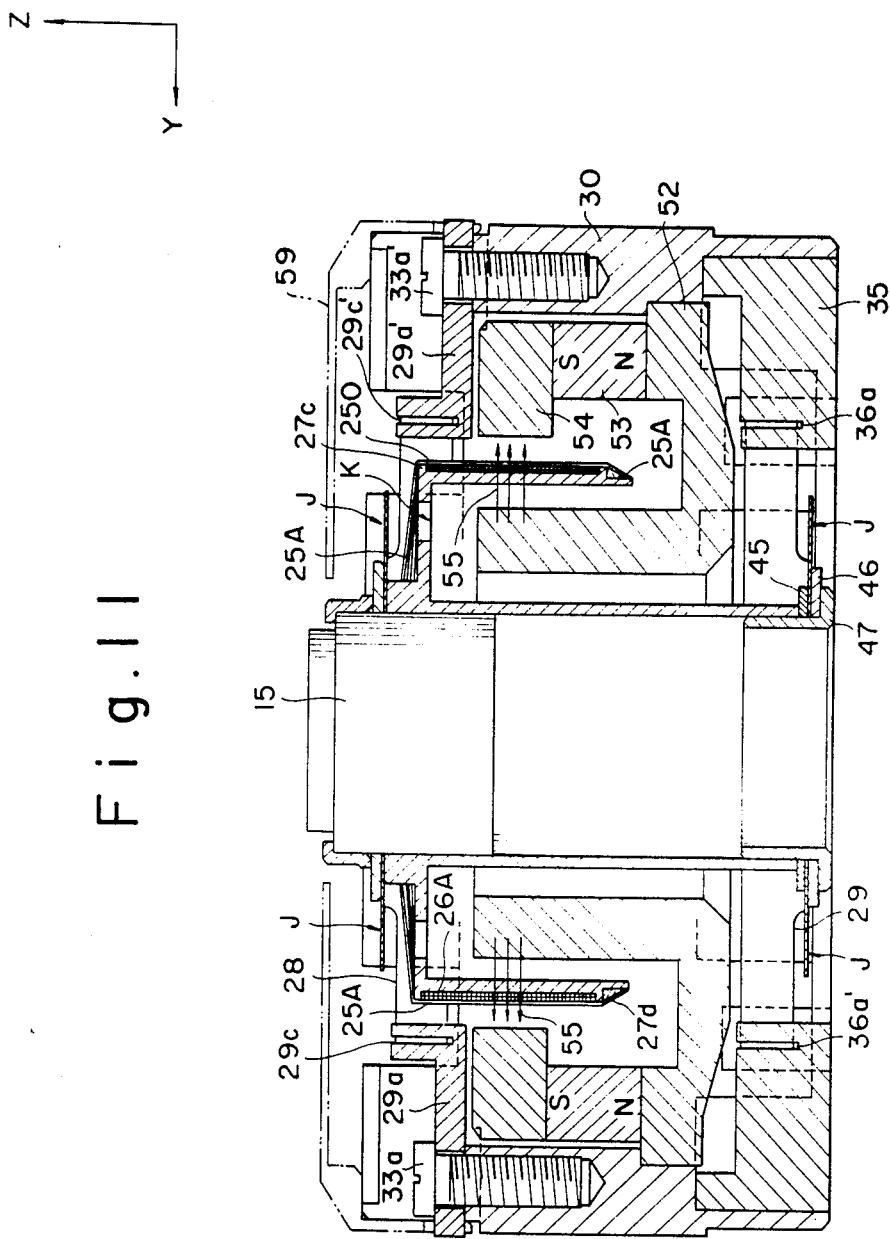
FIG. 11 is a cross sectional view of the apparatus of FIG. 7 taken along II—II line indicated in FIG. 9.
Figure 12:
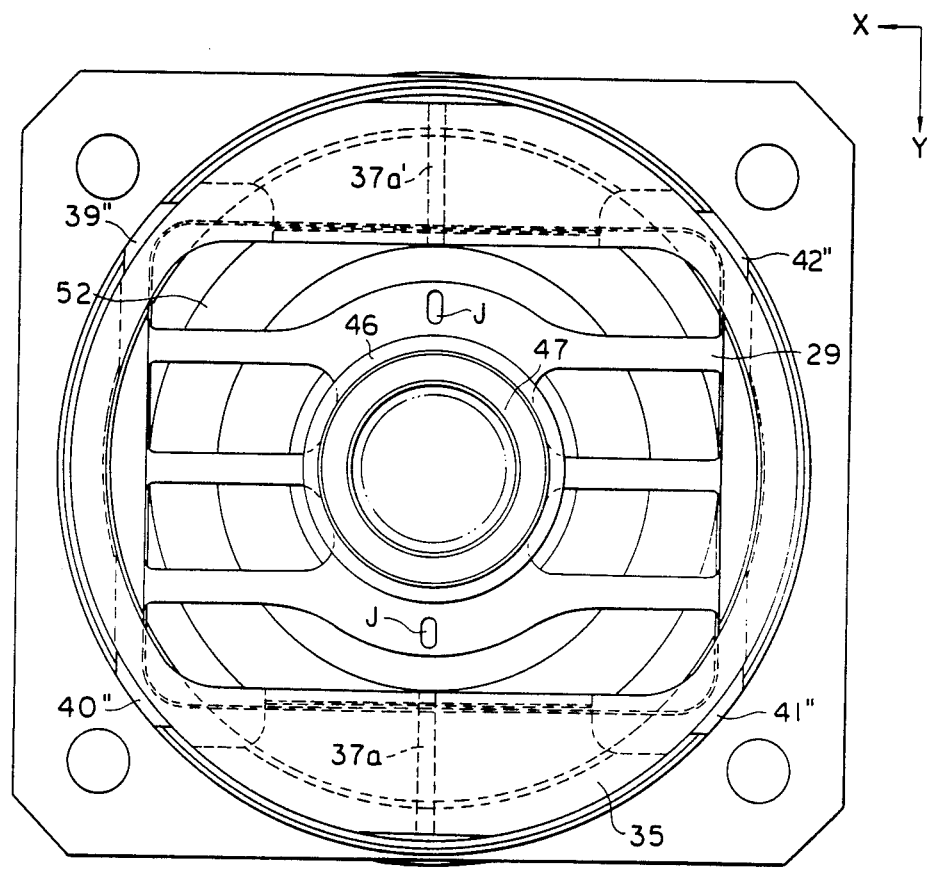
FIG. 12 is a bottom view of the apparatus shown in FIG. 7.

Now, it will be described in detail how the bobbin 27 is mounted on the spring support members 28 and 29. As shown in FIG. 10, a holding ring 43 is tightly fitted onto the top portion of the lens cell 15, which is then tightly fitted into the hollow portion 27a of the bobbin 27 through the hole 28c of the top spring member 28 with a rubber washer 44 sandwiched between the holding ring 43 and the top spring member 28. On the other hand, as regards the bottom mounting structure, there is provided a metal washer 45 placed against the bottom end of the bobbin 27 and then the bottom spring member 29 and a rubber washer 46 are positioned in this order, through all of which a flange 47 is then tightly fitted into the hollow portion 27a of the bobbin 27 from bottom. As indicated in FIG. 10, the bottom end of the lower cylinder 34 is also provided with cut-away portions 39"-42" corresponding in location to those 39'-42'.

Figure 9:
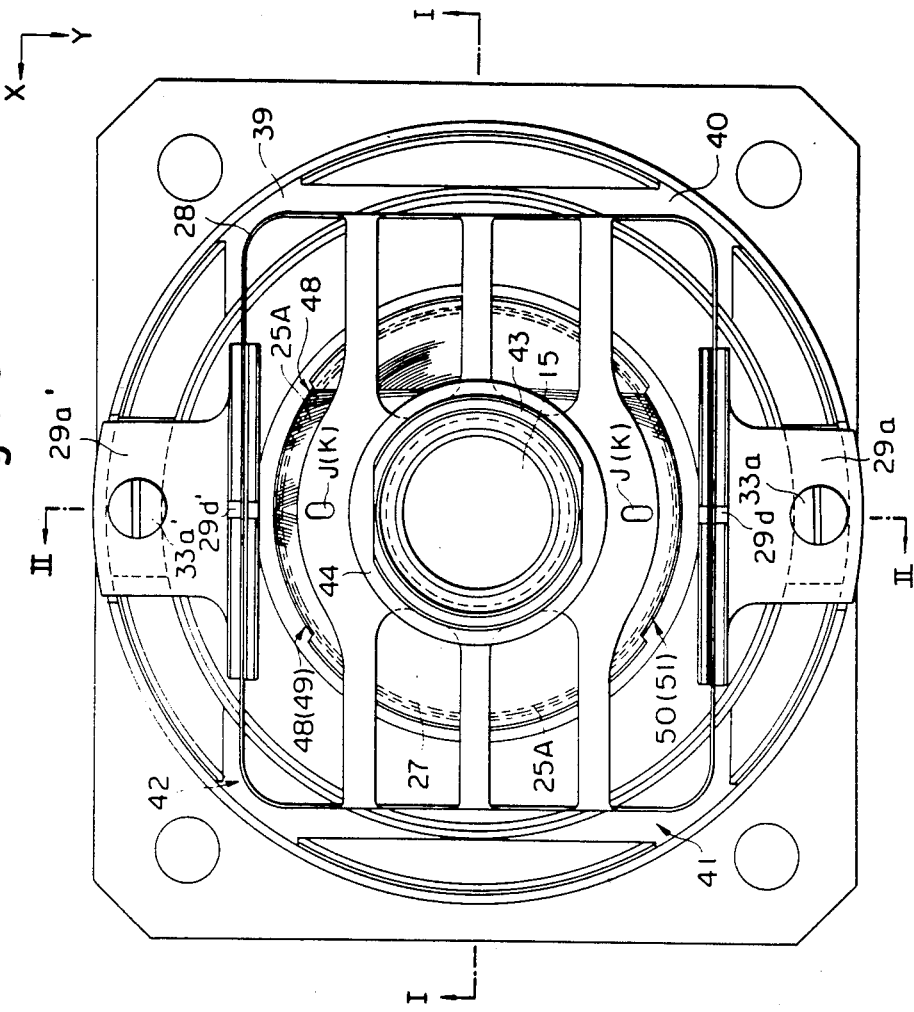
FIG. 9 is a plan view of the apparatus shown in FIG. 7.

The bobbin 27 includes a roofed cylinder section 27b on which is provided a pair of ridges 27c and 27d. The second driving coil 26A is provided as wound around the cylinder section 27c and between the ridges 27c and 27d. As shown in FIGS. 7 and 9, the ridges 27c and 27d are partly removed to define cut-away portions 48-51 which are formed on opposite sides of the bobbin 27 and arranged along Y direction. Thus, the first driving coil 25A is formed as wound around the bobbin 27 using these cut-away portions 48-51 as guides. It is to be noted that the bobbin 27 to be employed in the present invention is not limited to have a cylindrical structure as illustrated and it may take any other appropriate form such as a polygonal column.

Now, a description will be made as to the magnetic flux generating structure of the present apparatus. As shown in FIG. 10, there is provided an inner yoke 52 which is generally in the shape of a flange oriented with its flange portion at the bottom and its cylinder portion extending upwardly from the flange portion. The flange portion of the inner yoke 52 is tightly fitted into the case 30, and it is securely held in position by means of a fixture ring interposed between the yoke 52 and the flange member 35. On the other hand, the cylinder portion of the inner yoke 52 extends upwardly and substantially into the gap defined by the roofed cylinder section 27c of the bobbin 27. A ring-shaped permanent magnet 53 is placed on the flange portion of the inner yoke 52, and a ring-shaped outer yoke 54 is placed on the magnet 53, as shown in FIG. 10. These elements are adhered to each other to form an integrated structure. The outer yoke 54 extends inwardly to some extent to positively define a magnetic circuit segment in the air gap between the outer yoke 54 and the opposed portion of the inner yoke 52 such that the magnetic circuit segment thus formed intersects the first and second driving coils 25A and 26A. Incidentally, the reference numeral 55 indicates the direction of the magnetic field thus formed.

In operation, when current is supplied to flow through the first driving coil 25A, forces are exerted to move the bobbin 27 in X direction, or tracking control direction; on the other hand, when current is supplied to the second driving coil 26A, the bobbin 27 are forced to move in Z direction, or focusing control direction. Even if the bobbin 27 is moved in this manner, since the bobbin 27 is supported by the spring members 28 and 29 at its top as well as at its bottom, the lens cell 15 is prevented from deviating from the optical axis thereby insuring a high precision movement. It is to be noted that the cut-away portions 48-51 formed in the ridges 27c and 27d of the bobbin 27 must be positioned in a particular relation with respect to the orientation of the spring members 28 and 29. In other words, these cut-away portions 48-51 must be so positioned to oppose the locations where the spring members 28 and 29 are mounted on the case 30 in order to obtain a proper movement in X direction. For this reason, in order to insure such a required positional relation during manufacture, alignment holes are provided in the spring members 28, 29 and the bobbin 27. In the drawings, the alignment holes provided in the spring members 28 and 29 are indicated by the reference character "J" and those provided in the bobbin 27 are indicated by "K." The reference numeral 59 indicates a cap.

Figure 13:
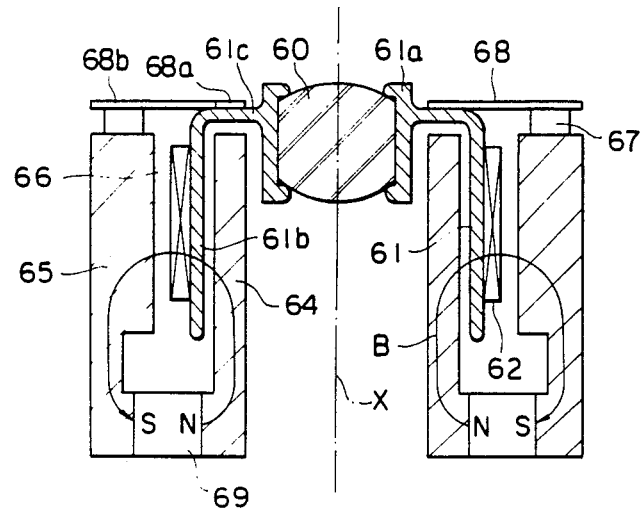
FIG. 13 is a cross sectional view of the optical recording and/or reading apparatus constructed in accordance with another embodiment of the present invention.
Figure 14:
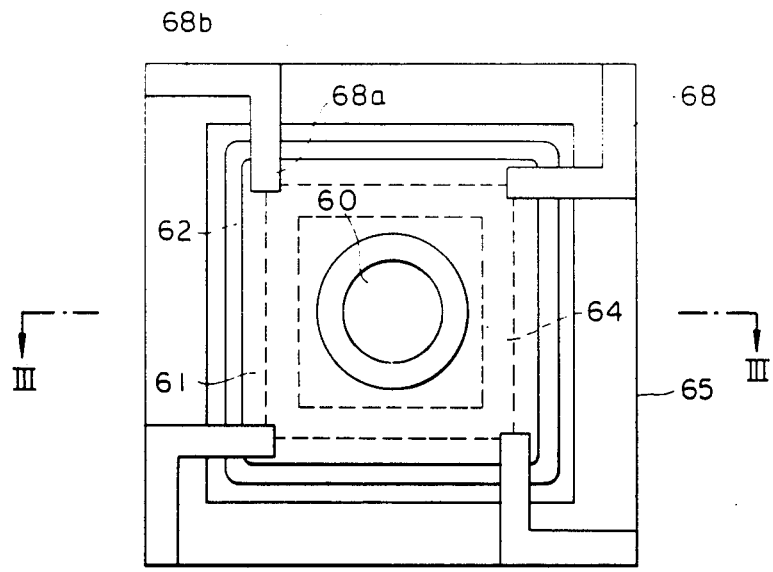
FIG. 14 is a plan view of the apparatus shown in FIG. 13.

Now, another embodiment of the present optical recording and/or reading apparatus will be described. The apparatus shown in FIGS. 13 and 14 includes an objective lens 60 which is supported by the supporting section 61a of a bobbin 61. The bobbin 61 is also formed with a cylinder section 61b on which is mounted a composite coil 62 including three different kinds of coils as will be made clear later. It is to be noted that the structure of the present embodiment is extremely simple because no other coil is required than the composite coil 62 wound around the cylinder section 61b. The composite coil 62 is placed in the gap 66 through which a magnetic circuit is formed by a magnet 69 and inner and outer yokes 64 and 65. That is, a magnetic field B is formed in the gap 66 between the inner and outer yokes 64 and 65, and the magnetic field B intersects the cylinder section 61b of the bobbin 61 and thus the composite coil 62 generally perpendicularly.

A spacer 67 is provided on the outer yoke 65 and spring supporting members 68 for supporting the bobbin 61 at the four corners are provided on the spacer 67. Described in detail, the free end 68a of each of the spring members 68 is connected to the shoulder section 61c of the bobbin 61, and the base end 68b is connected to the spacer 67. It is to be noted, however, that the spacer may be eliminated in some cases. In this manner, the coil bobbin 61, composite coil 62 and the lens 60 are integrally structured. It is to be also noted that the coil bobbin 61, composite coil 62, yokes 64 and 65, etc. are all squarely shaped in the illustrated embodiment; however, the present invention should not be limited only to such a particular shape, and they may by shaped rectangularly, cylindrically, or polygonally.

Figure 15:
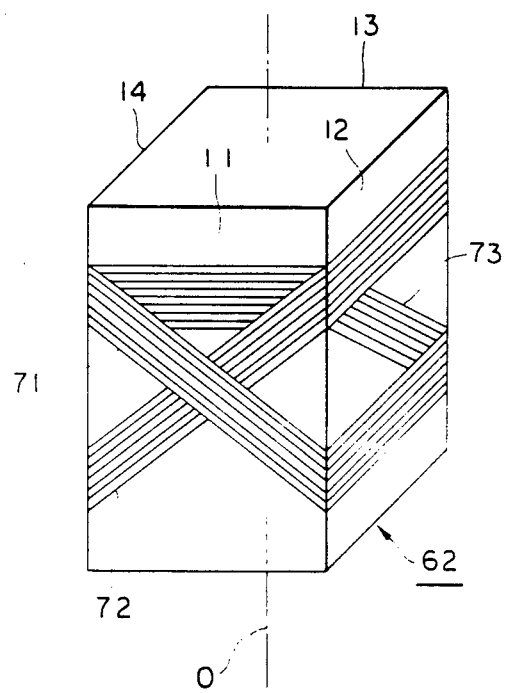
FIG. 15 is a perspective view schematically showing the composite coil structure incorporated in the apparatus of FIG. 13.

The detailed structure of the composite coil 62 is shown in FIG. 15. As shown, a first coil 71 is wound around the bobbin 61 having four surfaces 11, 12, 13 and 14 such that it extends in the direction perpendicular to the center axis O on the surfaces 12 and 14 and in the direction at a first predetermined angle with respect to the center axis O on the surfaces 11 and 13. Similarly, a second coil 72 is wound around the bobbin 61 such that it extends in the direction perpendicular to the center axis on the surfaces 12 and 14 and in the direction at a second predetermined angle with the center axis O. It is to be noted that first and second predetermined angles are same in magnitude but opposite in sign with respect to the center axis. A third coil 73 is wound around the bobbin 61 in a manner different from the first coil 71. That is, the third coil 73 is wound such that it extends in the direction perpendicular to the center axis O on the surfaces 11 and 13 and in the direction at a third predetermined angle with respect to the center axis O.

The operation of the present embodiment will now be described with particular reference to FIGS. 16 (a) through (d). For the purpose of illustration, it is assumed that all of the first, second and third angles formed between the inclined portions of the coils and the center axis O are same in absolute values, and that the magnetic field having the magnetic flux density B is directed to intersect each of the four surfaces 11-14 from inside toward outside.

Figure 16A:
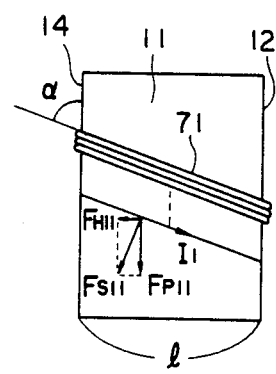
FIGS. 16(a)–(d) are schematics useful for explaining the operation of the composite coil structure of FIG. 15.
Figure 16B:
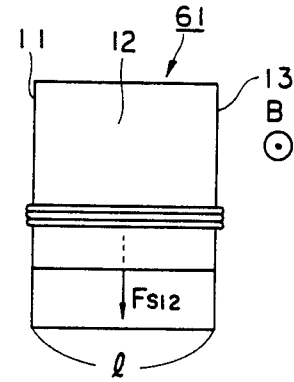

When current $I_1$ is supplied to flow through the first coil 71 in the direction indicated by the arrow, as shown in FIG. 16(a), assuming that the number of turns of the coil 71 is N, the net force $F_{s11}$ received by the inclined portions of the coil 71 (on surfaces 11 and 13) is directed as indicated in the drawings and may be expressed in the following manner.

$$F_{s11} = ((2BNl)/(\sin\alpha)) \times I_1 \qquad (1)$$

Accordingly, its horizontal component $F_{H11}$ and vertical component $F_{p11}$ may be expressed as follows:

$$F_{H11} = 2BNl \cot\alpha \, I_1 \qquad (2)$$

$$F_{p11} = 2BNlI_1 \qquad (3)$$

Furthermore, the net force received by the horizontal portions of the coil 71 (on surfaces 12 and 14) is directed as shown in the drawings and its magnitude may be expressed in the following manner.

$$F_{s12} = 2BNlI_1 \qquad (4)$$

Since no horizontal component exists in this case, the above equation also indicates the vertical component, and thus, $$F_{p12} = 2BNlI_1. \qquad (5)$$

As a result, the horizontal component $F_{H1}$ and vertical component $F_{p1}$ of the total force received by the coil 71 can be written in the following manner from the above equations (2), (3) and (5).

$$F_{H1} = F_{H11} = -2BNl \cot\alpha I_1 \qquad (6)$$

$$F_{p1} = F_{p11} + F_{p12} = 4BN1I_1 \quad (7)$$

Figure 16C:
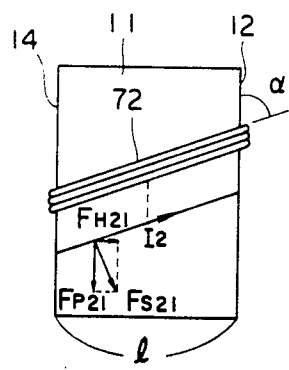
Figure 16D:
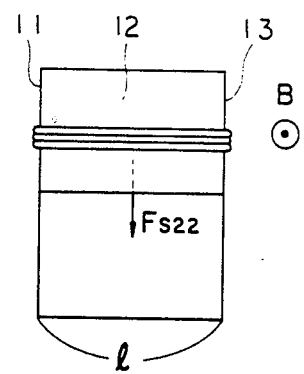

When current $I_2$ is supplied to flow through the second coil 72 in the direction as indicated in FIG. 16(c), the forces $F_{s21}$ and $F_{s22}$ received by the inclined and horizontal portions of the coil 72, respectively, are directed in the directions indicated by the arrows and their magnitudes may be expressed as follows:

$$F_{s21} = ((2BN1)/(\sin\alpha)) \times I_2 \quad (8)$$

$$F_{s22} = 2BN1I_2. \quad (9)$$

Accordingly, similarly with the case for the coil 71, the horizontal and vertical components $F_{H2}$ and $F_{p2}$ of the total force received by the coil 72 becomes $$F_{H2} = F_{H21} = +2BN1 \cot\alpha\, I_2, \text{ and} \quad (10)$$

$$F_{p2} = F_{p21} + F_{p22} = 4BN1I_2. \quad (11)$$

For the third coil 73, equations similar to those for the first coil 71 may be derived; however, the horizontal component force $F_{H3}$ for the coil 73 is in the direction perpendicular to that of the horizontal component force $F_{H1}$ for the coil 71. Thus, the force components $F_{H3}$ and $F_{p3}$ are written as follows:

$$F_{H3} = -2BN1 \cot\alpha\, I_3, \text{ and} \quad (12)$$

$$F_{p3} = 4BN1I_3. \quad (13)$$

From the above, denoting the total force in the focusing control direction by $F_p$, the total force in the tracking control direction by $F_y$ and the total force in the time axis control direction by $F_x$, then the following equations may be obtained by combining the above equations (6), (7), (10), (11), (12) and (13).

$$\left. \begin{array}{l} F_p = 4BN1(I_1 + I_2 + I_3) = K_0(I_1 + I_2 + I_3) \\ F_y = 2BN1\cot\alpha(I_2 - I_1) = K_1(I_2 - I_1) \\ F_x = -2BN1\cot\alpha\, I_3 = -K_1 I_3 \end{array} \right\} \quad (14)$$

where, $K_0 = 4BN1$ and $K_1 = 2BN1 \cot\alpha$.
From the above equations (14), the current $I_1$, $I_2$ or $I_3$ for each of the coils 71–73 may be obtained as follows:

$$\left. \begin{array}{l} I_3 = -F_x/K_1 \\ I_2 = (\frac{1}{2}) \times ((F_p/K_0) + (F_y/K_1) + (F_x/K_1)) \\ I_1 = (\frac{1}{2}) \times ((F_p/K_0) - (F_y/K_1) + (F_x/K_1)). \end{array} \right\} \quad (15)$$

As is apparent from the equations (15), if it is desired to move the bobbin 61 only in the tracking direction, it is only necessary to supply current to the first and second coils 71 and 72 to satisfy the condition of $I_1 = -I_2$. If it is desired to move the bobbin 61 only in the time axis control direction, the conditions to be met in supplying current are $I_1 = I_2$ and $I_3 = -2I_1$. If it is desired to move the bobbin 61 only in the focusing control direction, then the current must be supplied to both of the first and second coils 71 and 72 under the condition of $I_1 = I_2$.

Figure 17:
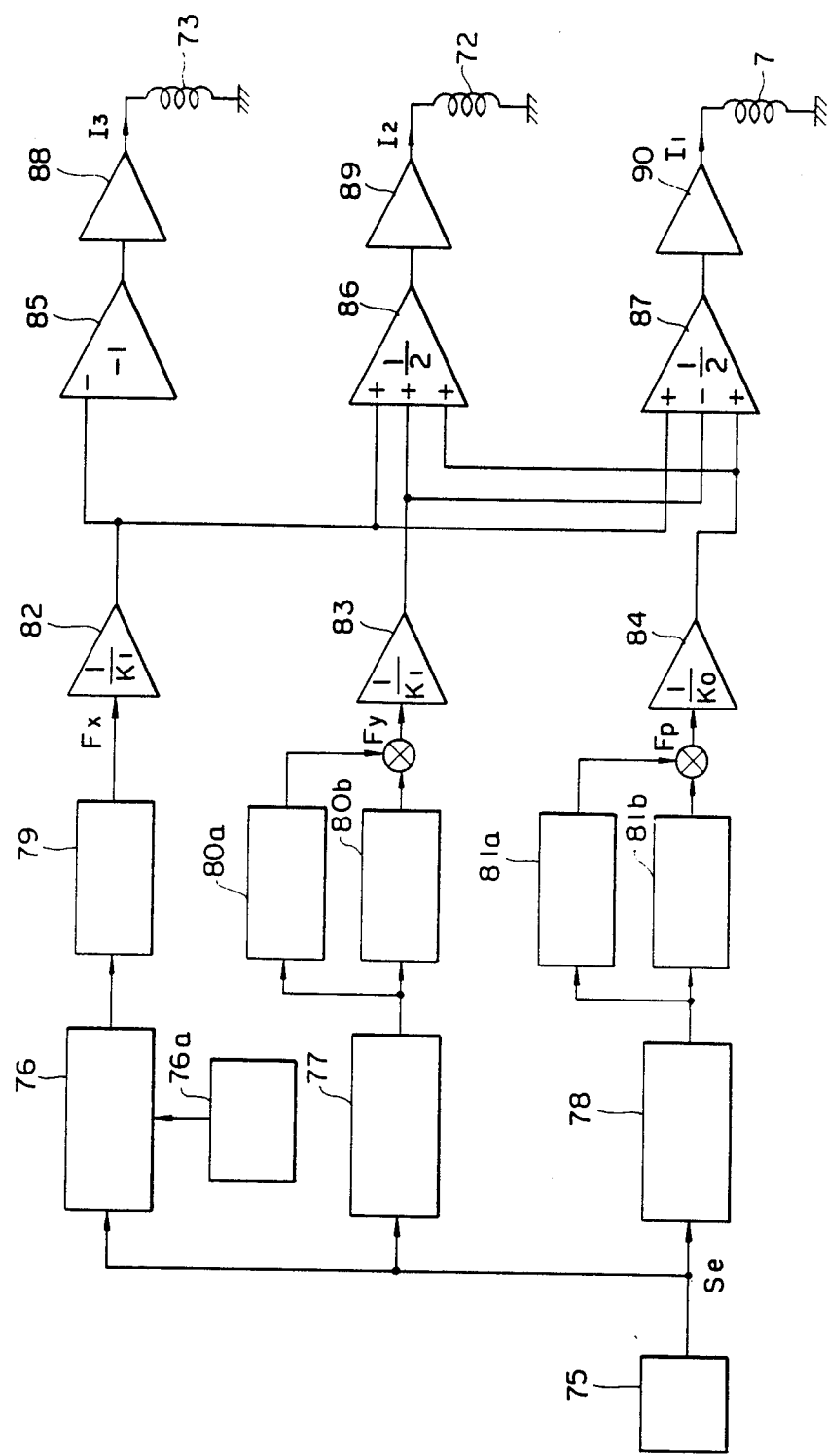
FIG. 17 is a block diagram showing a driving control circuit which may be used to control the supply of driving current to the composite coil structure of FIG. 15.

FIG. 17 shows in block diagram a driving control circuit which controls the supply of the driving current to each of the coils 71–73 to carry out the desired functions as described above. The circuit includes an error detecting sensor 75 which is connected to a time axis error detecting circuit 76, a tracking error detecting circuit 77 and a focusing error detecting circuit 78. Also provided as connected to the time axis detecting circuit 76 is a reference clock generator 76a. The time axis detecting circuit 76 is then connected to a phase compensating circuit 79, which, in turn, is connected to an amplifier 82. The tracking error detecting circuit 77 is connected to a differentiating circuit 80a and a phase compensating circuit 80b, both of which, in turn, are connected to an amplifier 83. And, the focusing error detecting circuit 78 is also connected to a differentiating circuit 81a and a phase compensating circuit 81b, both of which, in turn, are connected to an amplifier 84. Then, the amplifier 82 is connected to arithmetic circuits 85, 86 and 87; the amplifier 83 is connected to the arithmetic circuits 86 and 87; and the amplifier 84 is connected to the arithmetic circuits 86 and 87. The arithmetic circuits 85, 86 and 87 are connected to the coils 73, 72 and 71, respectively, through respective servo-amplifiers 88, 89 and 90.

In operation, based on a signal Se detected by the error detecting circuit 75, the levels of the forces $F_x$, $F_y$ and $F_p$ to be obtained by driving the coils 71, 72 and 73 (and thus the lens 60) are first determined by the respective error detecting circuits 76, 77 and 78. In this case, the time axis error detecting circuit 76 uses the clock signal supplied from the reference clock generator 76a as a base. The phase compensating circuits 79, 80b and 81b and the differentiating circuits 80a and 81a are provided to stabilize the operation of each of the control systems. Upon determination of $F_x$, $F_y$ and $F_p$, the magnitudes of the currents $I_1$, $I_2$ and $I_3$ are determined by the equations (15). This is carried out by the arrangement including the amplifiers 82, 83 and 84 and the arithmetic circuits 85, 86 and 87 connected as shown in FIG. 17. The outputs from the arithmetic circuits 85, 86 and 97 are then supplied to the coils 73, 72 and 71 through the respective servo-amplifiers 88, 89 and 90, so that the lens 60 is moved as desired.

Figure 18A:
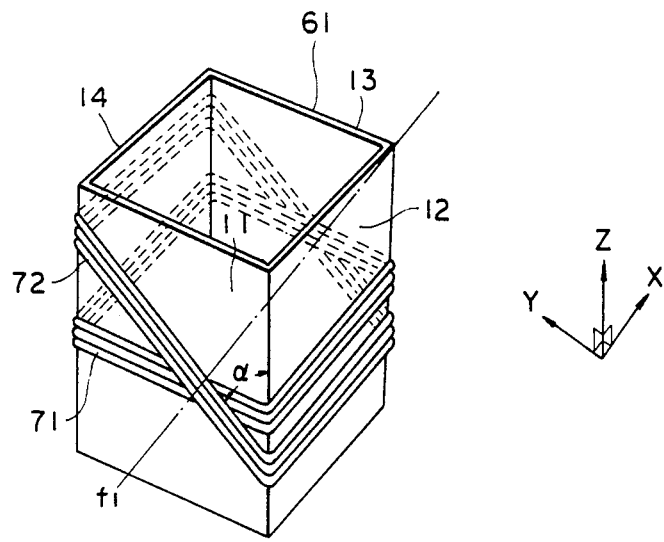
FIGS. 18(a) and (b) are perspective views schematically illustrating another form of the composite coil structure which may be incorporated into the apparatus of FIG. 13.

FIGS. 18 (a) and (b) show another embodiment of the composite coil structure to be used in the present optical recording and/or reading apparatus. As shown, the center axis O of the bobbin 61 is aligned with Z axis (focusing control direction) of Cartesian coordinates. Y axis coincides with the tracking control direction and X axis is taken for the time axis control direction, or the jitter control direction. And, the plane including X and Y axes is in parallel with the recording surface of a recording medium such as a recording disc. As shown, similarly with the previous embodiment, the bobbin 61 is square in cross section and it has four side surfaces 11, 12, 13 and 14 which are rectangular in shape.

Figure 18B:
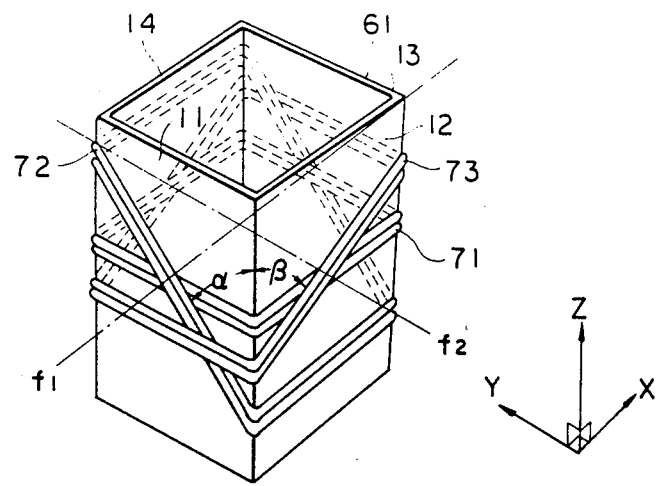

As shown in FIG. 2(a), around the bobbin 61 is wound the first driving coil 71, the cross section of which is perpendicular to the center axis of the bobbin 61, or Z axis. Also wound around the bobbin 61 is the second driving coil 72, whose portions lying on the surfaces 11 and 13 are inclined to form an angle $\alpha$ with respect to Z axis and whose the other portions lying on the surfaces 12 and 14 are in parallel with X axis. And, the line $t_1$ defined by connecting the two merging points between the coils 71 and 72 extends in parallel with X axis. FIG. 18(b) shows the case when the third driving coil 73 is additionally wound around the structure of FIG. 18(a). As shown, those portions of the third driving coil 73, which lies on the surfaces 12 and 14, are inclined to form an angle 8 with respect to Z axis and the remaining portions of the coil 73, which lies on the surfaces 11 and 13, are in parallel with Y axis. The line $t_2$ connecting the two merging points formed between the coils 71 and 73 extends in parallel with Y axis. It is to be noted that crossing between the coils on the surfaces of the bobbin 61 is not a requirement in the present invention, and thus the coils may be positioned spaced apart from each other with no crossing between them on the surfaces of the bobbin 61.

Now, the operation of the structure shown in FIG. 18(b) will be described in detail with reference to the schematics shown in FIGS. 19-21. Similarly with the previous embodiment, the surfaces 11 and 13 of the bobbin 61 are in parallel with Y-Z plane of the Cartesian coordinates and the surfaces 12 and 14 are in parallel with X-Z pane. The magnetic field having magnetic flux density B penetrates through each of the surfaces 11-14 of the bobbin 61 perpendicularly.

Figure 19A:
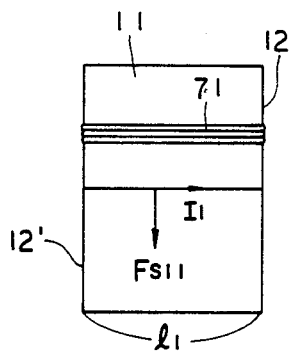
FIGS. 19(a) and (b) through FIGS. 21(a) and (b) are schematics useful for explaining the operation of the composite coil structure shown in FIGS. 18(a) and (b)
Figure 19B:
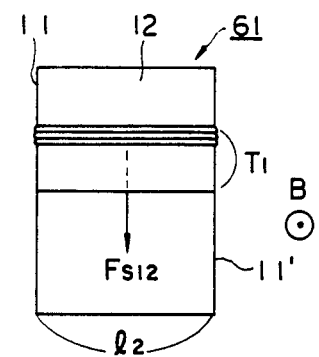

As shown in FIGS. 19(a) and (b), the first driving coil 71 is wound around the bobbin 61 over $N_1$ number of turns across the width $T_1$, those portions of the coil 71 lying on the surfaces 11 and 13 are $L_1$ long and the remaining portions lying on the surfaces 12 and 14 are $L_2$ long. Under the conditions, when current $I_1$ is supplied to the coil 71, those portions of the coil 71 lying on the surfaces 11 and 13 receive the following force $F_{s11}$.

$$F_{s11} = 2BN_1T_1L_1I_1$$

On the other hand, those portions of the coil 71 lying on the surfaces 12 and 14 receive the force $F_{s12}$ expressed by the following equation.

$$F_{s12} = 2BN_1T_1L_2I_1$$

Since these forces are directed in Z axis, the forces acting on the respective portions of the coil 71 in the direction of the center axis of the bobbin 61 may be expressed as in the following manner.

$$F_{p11} = F_{s11} = 2BN_1T_1I_1 \tag{16}$$

$$F_{p12} = F_{s12} = 2BN_1T_1L_2I_1 \tag{17}$$

Figure 20A:
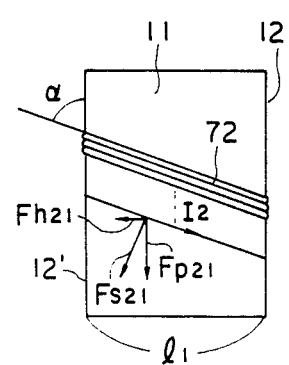
Figure 20B:
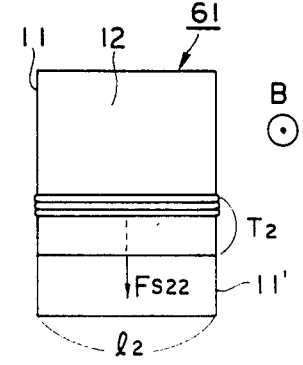

As regards the second driving coil 72, as shown in FIGS. 20 (a) and (b), the coil 72 is wound around the bobbin 61 over $N_2$ number of turns across the width $T_2$. The net force $F_{s21}$ acting on and in the direction perpendicular to the inclined portions of the coil 72 may be expressed as follows:

$$F_{s21} = ((2BN_2T_2L_1)/(\sin\alpha)) \times I_2. \tag{18}$$

On the other hand, the net force $F_{s22}$ acting on the horizontal portions of the coil 72 in the direction perpendicular thereto may be expressed as follows:

$$F_{Fs22} = 2BN_2T_2L_2I_2. \tag{19}$$

Since the force $F_{s21}$ is not in parallel with the center axis of the bobbin 61, its horizontal component $F_{h21}$ in parallel with Y axis and its vertical component $F_{p21}$ in parallel with Z axis may be derived as follows:

$$F_{h21} = F_{s21} \times \cos\alpha = 2BN_2T_2L_1I_2 \cot\alpha \tag{20}$$

$$F_{p21} = F_{s21} \times \sin\alpha = 2BN_2T_2L_1I_2 \tag{21}$$

Since the force $F_{s22}$ is directed in parallel with Z axis, it may be equated to the force $F_{p22}$ in parallel with the center axis of the bobbin 61.

$$F_{p22} = F_{s22} = 2BN_2T_2L_2I_2 \tag{22}$$

Figure 21A:
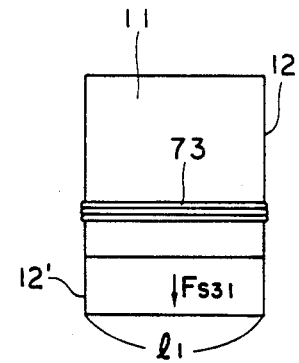
Figure 21B:
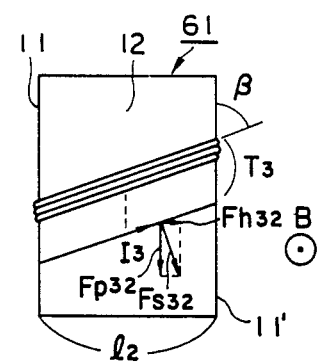

Referring to FIGS. 21(a) and (b), the third driving coil 73 is wound around the bobbin 61 over $N_3$ number of turns aoross the width $T_3$, and, thus, the horizontal portions of the coil 73 receive the following force $F_{s31}$ in the direction perpendicular thereto.

$$F_{s31} = 2BN_3T_3L_1I_3 \tag{23}$$

On the other hand, the inclined portions of the coil 73 receive the following force $F_{s32}$ in the direction perpendicular thereto.

$$F_{s32} = ((2BN_3T_3L_2)/(\sin\beta)) \times I_3 \tag{24}$$

Since the force $F_{s32}$ is not in parallel with the center axis of the bobbin 61, or Z axis, its horizontal component $F_{h32}$ in X axis and its vertical component $F_{p32}$ in Z axis may be derived as follows:

$$F_{h32} = F_{s32} \times \cos\beta = 2BN_3T_3L_2I_3 \cot\beta \tag{25}$$

$$F_{p32} = F_{s32} \times \sin\beta = 2BN_3T_3L_2I_3 \tag{26}$$

Since the force $F_{s31}$ is in parallel with Z axis, it is equal to the vertical force $F_{p31}$ in parallel with the center axis of the bobbin 61.

$$F_{p31} = F_{s31} = 2BN_3T_3L_1I_3 \tag{27}$$

Under the conditions, when currents $I_1$, $I_2$ and $I_3$ are supplied to the respective coils 71, 72 and 73, then the net force applied to the bobbin 61 has the horizontal component $F_{HX}$ in X axis direction, the other horizontal component $F_{HY}$ in Y axis direction and the vertical component $F_P$ in Z axis direction as expressed in the following manner.

$$F_{HX} = F_{h32} = 2BN_3T_3l_2I_3\cot\beta \tag{28}$$

$$F_{HY} = F_{h21} = 2BN_2T_2l_1I_2\cot\alpha \tag{29}$$

$$F_P = F_{p11} + F_{p12} + F_{p21} + F_{p22} + F_{p31} + F_{p32} \tag{30}$$
$$= 2B(l_1 + l_2) \times (N_1T_1I_1 + N_2T_2I_2 + N_3T_3I_3)$$

Defining that $$2B(l_1+l_2)N_1T_1 = K_{1A}$$

$$2B(l_1+l_2)N_2T_2 = K_{1B}$$

$$2B(l_1+l_2)N_3T_3 = K_{1C}$$

$$2BN_2T_2l_1\cot\alpha = K_2$$

$$2BN_3T_3l_2\cot\alpha = K_3$$

then, the above equations (28)–(30) may be expressed by $$F_{HX} = K_3I_3 \tag{31}$$

$$F_{HY} = K_2I_2 \tag{32}$$

$$F_P = K_{1A}I_1 + K_{1B}I_2 + K_{1C}I_3. \tag{33}$$

From equations (31)–(32), the following equations for $I_1$, $I_2$ and $I_3$ may be obtained.

$$I_1 = F_P/K_{1A} - K_{1C}F_{HX}/K_{1A}K_3 - K_{1C}F_{HY}/K_{1A}K_2 \tag{34}$$

$$I_2 = F_{HY}/K_2 \tag{35}$$

$$I_3 = F_{HX}/K_3 \tag{36}$$

As is obvious from equations (34)–(36), if it is desired to move the bobbin 61 only in the vertical direction, it can be done by supplying current $I_1$ to the coil 71 only. If it is desired to move the bobbin 61 only in Y axis direction, it can be done by supplying the current $I_2$ in commensurate in amount with the desired amount of movement $F_{HY}$ to the coil 72 and at the same time by supplying the current of $I_1 = -K_{1C}F_{hy}/K_{1A}K_2$ to the coil 71 so as to cancel out the vertical force component produced by the current $I_2$ supplied to the coil 72. Likewise, in the event of moving the bobbin 61 only in X axis direction, it is only necessary to supply the current I3 corresponding in magnitude to the desired amount of movement FHY to the coil 73 and at the same time to supply the current of $I_1 = -K_{1C}F_{HX}/K_{1A}K_3$ to the coil 71 so as to cancel out the vertical force component produced by the current $I_3$ flowing through the coil 73.

In general, upon determination of a desired amount of movement of the bobbin 61 in a desired direction, i.e., values of $F_{HX}$, $F_{HY}$ and $F_P$, the required currents to be supplied to the coils 71–73 are determined by the equations (34)–(36). And, by supplying the thus determined currents to the respective coils, the bobbin 61 and thus the lens 60 may be moved in a desired manner to keep proper focusing and tracking conditions. It is to be noted that the above-described embodiment is so structured to carry out control for focusing, tracking and jittering; however, in some applications, the jittering control may be omitted without causing practical problems, in which case the structure may be further simplified.

Figure 22:
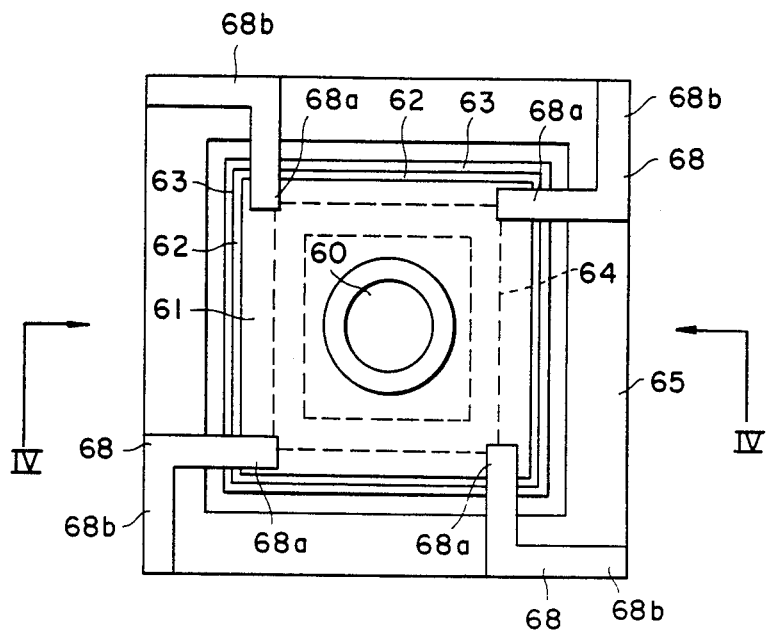
FIG. 22 is a plan view of the optical recording and/or reading apparatus constructed in accordance with a further embodiment of the present invention.
Figure 23:
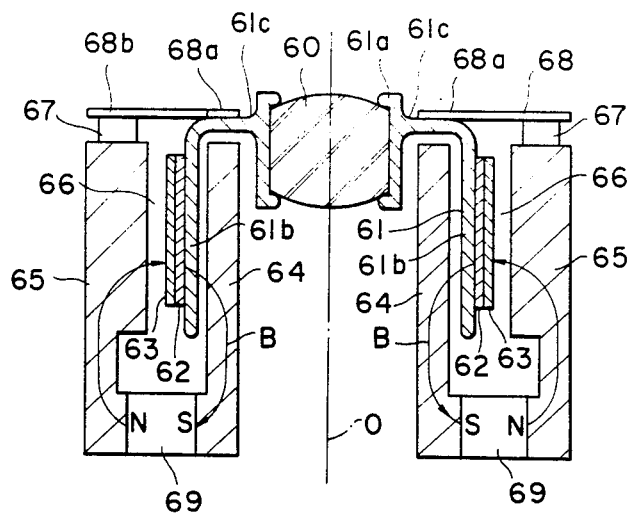
FIG. 23 is a cross sectional view of the apparatus shown in FIG. 22 taken along IV—IV line.

A further embodiment of the present optical recording and/or reading apparatus including a plane coil structure will now be described. As shown in FIGS. 22 and 23, the overall structure of this apparatus is substantially the same as that of the above-described embodiment shown in FIGS. 13 and 14, so that like reference characters are used in FIGS. 22 and 23 to indicate like elements and the repetition of description is avoided. The only difference between the present embodiment and the previous embodiment resides in the structure of the composite coil which is to be provided on the bobbin 61. In other words, in the present embodiment, as will be fully described later, use is made of a plane coil structure which is made of a thin film or foil of conductive material formed on or attached to the side surfaces of the bobbin 61. In the particular embodiment shown in FIGS. 22 and 23, the coil structure provided on the bobbin 61 has a two-layer structure including a first composite coil 62 provide on the side surfaces 11–14 of the bobbin 61 and a second composite coil 63 overlying the first composite coil 63.

Figure 24:
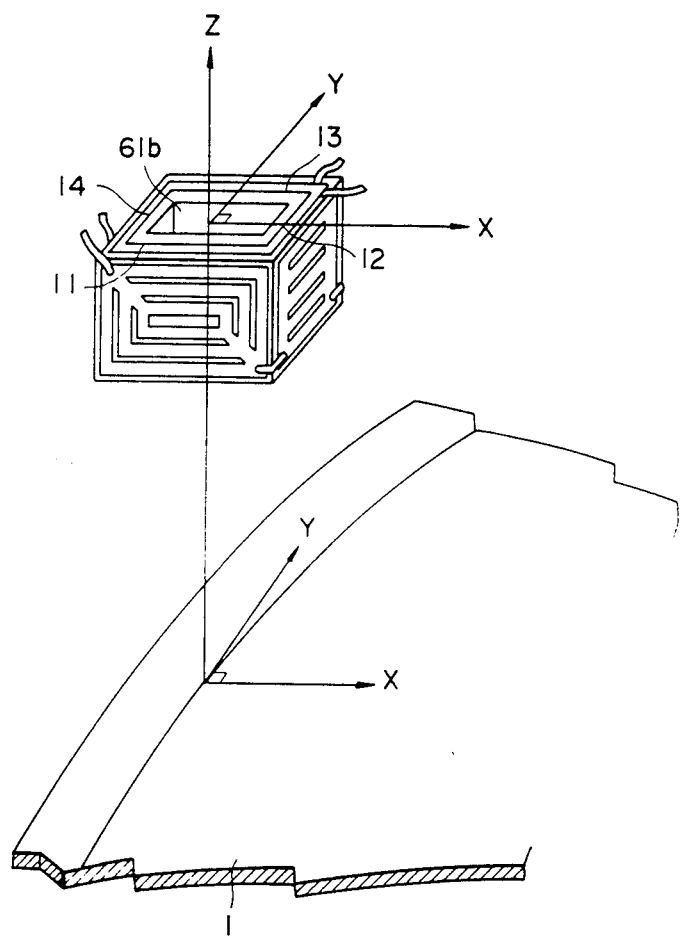
FIG. 24 is a schematic illustration showing the positional relation between the composite coil of the present apparatus and the recording disc 1.

FIG. 24 illustrates the relative positional relation between the bobbin 61 having thereon the two-layer composite coil and the recording disc 1. As shown, the cylinder section 61b of the bobbin 61 has four side surfaces 11, 12, 13 and 14, among which the surfaces 12 and 14 are in parallel with the tangential line Y drawn at the merging point between the center line of the bobbin 61 and a track on the disc 1 and the surfaces 11 and 13 are in parallel with X direction which is perpendicular to the tangential direction Y. As stated above, on these four surfaces 11–14 are provided the first composite coil 62 on which is provided the second composite coil 63 as electrically insulated from the first composite coil 62.

Figure 25:
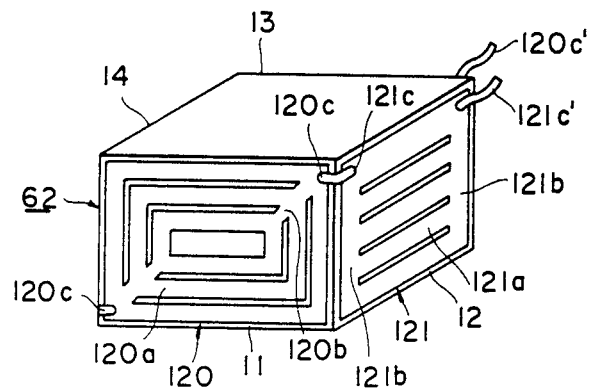
FIG. 25 is a perspective view showing the first coil assembly, comprised of a pair of first plane coils and a pair of second plane coils, of the two-layer composite coil employed in the apparatus shown in FIGS. 22 and 23.

FIG. 25 shows in perspective the detailed structure of the first composite coil 62. As shown, it includes a pair of first plane coils 120, 120 of an identical structure to be disposed on the surfaces 11 and 13 of the bobbin 61 and a pair of second plane coils 121, 121 of an identical structure to be disposed on the surfaces 12 and 14. These plane coils 120 and 121 may be formed in any well known manner, for example, by adhering or attaching appropriately shaped, conductive strips such as shaped copper foils or by vapor deposition of a selected conductive material. In the present embodiment, the first plane coil 120 includes a plurality of L-shaped strips 120a and a diagonal strip 120b to which all of the L-shaped strips are connected, as shown. A pair of first leads 120c and 120c are connected to the diagonal strip 120b one at each end. The second plane coil 121 includes a plurality of horizontal strips 121a arranged vertically and a pair of end strips 121b to which the ends of each of the horizontal strips 121a are connected. A pair of second leads 121c and 121c' are provided as connected to the top ends of the end strips 121b, 121b. It is to be noted that the corresponding leads 120c and 121c are interconnected excepting the two leads 120c' and 121c', which are connected to a driving control circuit.

Figure 26:
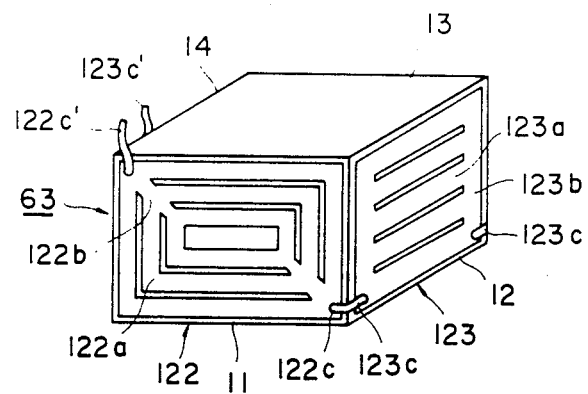
FIG. 26 is a perspective view showing the second coil assembly comprised of a pair of third plane coils and a pair of fourth plane coils and formed on the first coil assembly of FIG. 25 as electrically insulated therefrom.

FIG. 26 shows in perspective the second composite coil 63 to be provided on the first composite coil 62 of FIG. 25 with an insulating layer therebetween. As shown, the second composite coil 63 includes a pair of third plane coils 122 and 122 of an identical structure to be disposed above the first plane coils 120 and 120 of the first composite coil 62 and a pair of fourth plane coils 123 and 123 of an identical structure to be disposed above the second plane coils 121 and 121 of the first composite coil 62. Each of the third plane coils 122 and 122 includes a plurality of L-shaped strips 122a and a diagonal strip 122b to which the ends of each of the L-shaped strips are connected. A pair of leads 122c and 122c' are connected to the respective ends of the diagonal strip 122b. The fourth plane coils 123, 123 are each comprised of a plurality of horizontal strips 123a and a pair of end strips 123b, at the bottom end of each of which is connected a lead 123c, 123c. It is to be noted that the corresponding leads are interconnected excepting the two leads 122c' and 123c', and thus all of the four plane coils 122, 123, 122 and 123 are connected in series, similarly with the coil of FIG. 25.

Although not indicated specifically, a magnetic field is formed to penetrate through each of the plane coils from inside to outside of the bobbin 61. And, thus, when driving current is supplied to flow through the series connected plane coils of each of the composite coils 62 and 63 via the leads 120c', 121c' and 122c', 123c', each of the plane coils receive electromagnetic forces as will be fully described below, so that the bobbin 61 will move in the X-Z plane.

Figure 27A:
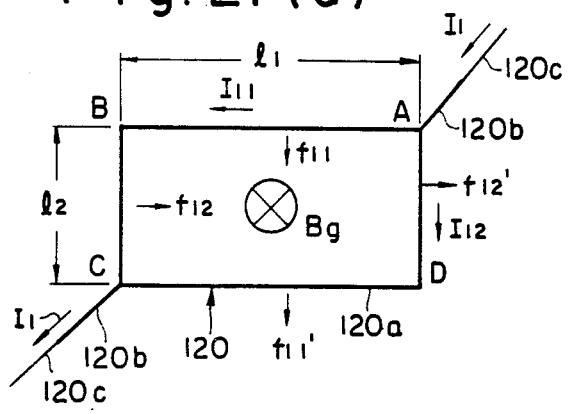
FIGS. 27 through 29 are schematics which are useful for understanding the operation of the two-layer composite coil shown in FIGS. 25 and 26.

FIG. 27(a) illustrates a schematic of a pair of corresponding L-shaped strips 120a which are connected at both ends and to the diagonal strips 120b, 120b, each of which, in turn, is connected to the respective lead 120c, 120c. Assuming that a driving current $I_1$ flows into the diagonal strip 120b through the lead 120c, it is divided into two components $I_{11}$ and $I_{12}$ at point A, and the thus divided components flow through the respective paths A-B-C and A-D-C to be combined again at point C to be discharged through the diagonal strip 120b and lead 120c. As indicated, the path A-B or D-C has the length $l_1$ and the path B-C or A-D has the length $l_2$. Also indicated in FIG. 27(a) is the magnetic field $B_g$ directed into the plane of the drawings perpendicularly.

Under the conditions, denoting the forces exerted to the paths A-B, B-C, A-D and D-C by $f_{11}$, $f_{12}$, $f_{12}'$ and $f_{11}'$, respectively, they can be expressed as $$f_{11} = B_g I_{11} l_1 \tag{37}$$

$$f_{12} = B_g I_{11} l_2 \tag{38}$$

$$f_{12}' = B_g I_{12} l_2 \tag{39}$$

$$f_{11}' = B_g I_{12} l_1. \tag{40}$$

The total downward force $f_{111}$ is a sum of the equations (37) and (40), and thus given by $$\begin{aligned} f_{111} &= f_{11} + f_{11}' \\ &= B_g I_{11} l_1 + B_g I_{12} l_1 \\ &= B_g l_1 (I_{11} + I_{12}) \\ &= B_g l_1 I_1. \end{aligned} \tag{41}$$

On the other hand, the total horizontal force $f_{112}$ is a sum of the equations (38) and (39), so that $$\begin{aligned} f_{112} &= f_{12} + f_{12}' \\ &= B_g I_{11} l_2 + B_g I_{12} l_2 \\ &= B_g l_2 (I_{11} + I_{12}) \\ &= B_g l_2 I_1. \end{aligned} \tag{42}$$

Figure 27B:
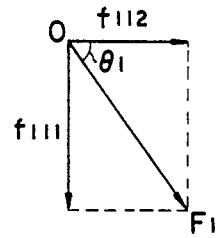

These vertical and horizontal forces f111 and f112 are directed as indicated in FIG. 27(b), and the resultant force $F_1$ may be obtained from the equations (41) and (42) as follows:

$$F_1 = \sqrt{f_{111}^2 + f_{112}^2} \tag{44}$$

$$= B_g I_1 \sqrt{l_1^2 + l_2^2}$$

and the angle $\theta_1$ is
$$\tan \theta_1 = f_{111}/f_{112} = l_1/l_2. \tag{44}$$

Figure 28:
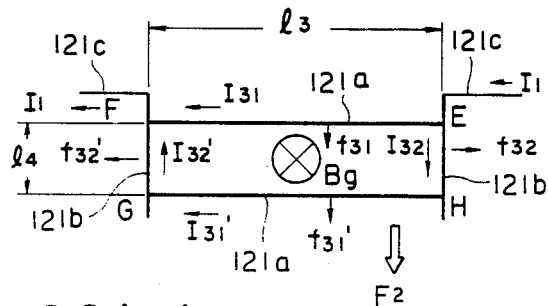

Since the paths $l_1$ and $l_2$ are constant in length, the interconnected L-shaped strips 120a receive the force $F_1$ at the angle $\theta_1$ with respect to the horizontal direction. It should also be noted that the other plane coil 120 is provided on the opposite surface 13 of the bobbin 61 and thus the force same in magnitude and direction as those of the force $F_1$ is also produced on the surface 13 of the bobbin 61. FIG. 28 illustrates the schematic of two horizontal strips 121a, 121a connected to the end strips 121b, 121b on both ends of the second plane coil 121 provided on the surface 12 of the bobbin 61. As shown, the driving current $I_1$ is supplied via the right lead to the top of the right end strip 121b. Since the current is divided or combined at the intersections, the current components flowing through the paths E-F, E-H, H-G and G-F are defined by $I_{31}$, $I_{32}$, $I_{31}'$ and $I_{32}'$, respectively. Accordingly, the paths E-F, E-H, H-G and G-F each receive the forces $f_{31}$, $f_{32}$, $f_{31}'$ and $f_{32}'$, respectively, in the direction indicated in FIG. 28, and these forces may be expressed in the following manner.

$$f_{31} = B_g I_1 l_3 \tag{45}$$

$$f_{31}' = B_g I_{31}' l_3 \tag{46}$$

$$f_{32} = B_g I_{32} l_4 \tag{47}$$

$$f_{32}' = -B_g I_{32}' l_4 \tag{48}$$

where, $I_{32} = I_{32}'$, $l_3$ is the length of the path H-G and $l_4$ is the length of the path E-H or G-F. Therefore, the resultant force $F_2$ acting on the strip structure shown in FIG. 28 is simply a sum of $f_{31}$ and $f_{32}$ because f and $f_{32}'$ cancel out. Thus, $$\begin{aligned} F_2 &= f_{31} + f_{31}' \\ &= B_g l_3 (I_{31} + I_{31}'). \end{aligned} \tag{49}$$

Since the plane coil 121 is also provided on the opposite surface 14 of the bobbin 61, the force same in magnitude and direction as those of the resultant force $F_2$ is applied to the surface 14 of the bobbin 61.

Figure 29A:
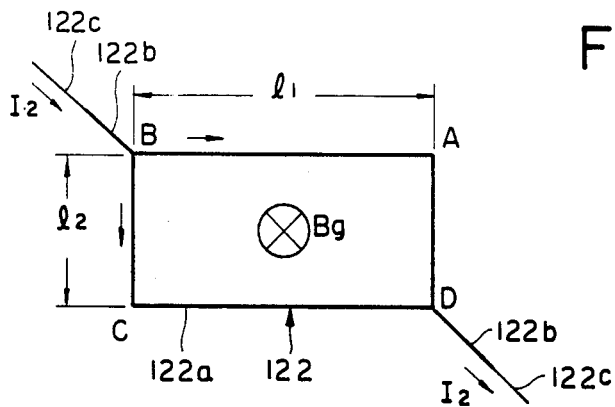
Figure 29B:
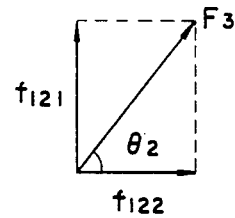

FIG. 29(a) illustrates the schematic of the two L-shaped strips connected to each other on both ends and to the diagonal strip 122b of the third plane coil 122 of the second composite coil 63. Since the structure shown in FIG. 29(a) is similar to the structure shown in FIG. 27(a), the analysis may be carried out in a similar manner. Thus, the paths B-A and C-D receive the force $f_{121}$ directed upward and the paths B-C and A-D receive the force $f_{122}$ directed to the right, as indicated in FIG. 29(b).

$$f_{121} = B_g l_1 I_2 \tag{50}$$

$$f_{122} = B_g l_2 I_2 \tag{51}$$

The resultant force $F_3$ of these forces $f_{121}$ and $f_{122}$ may be expressed in the following manner.

$$F_3 = \sqrt{f_{121}^2 + f_{122}^2} \tag{52}$$

$$= B_g I_2 \sqrt{l_1^2 + l_2^2}$$

And, the angle $\theta_3$ formed between $F_3$ and $f_{122}$ may be defined as $$\tan \theta_3 = f_{121}/f_{122} = l_1/l_2. \tag{53}$$

Thus, the force $F_3$ as determined above is applied to the surface 11. It is to be noted that the similar force is applied to the surface 13 which is opposite to the surface 11.

As will be easily understood, the fourth plane coil 123 of the second composite coil 63 receives the force similar to that analyzed with respect to the identically structured second plane coils 121 of the first composite coil 62.

As described above, the movement of the bobbin 61 in the X-Z plane may be appropriately controlled by controlling the magnitude and direction of the driving current $I_1$ and/or $I_2$.

Figure 30A:
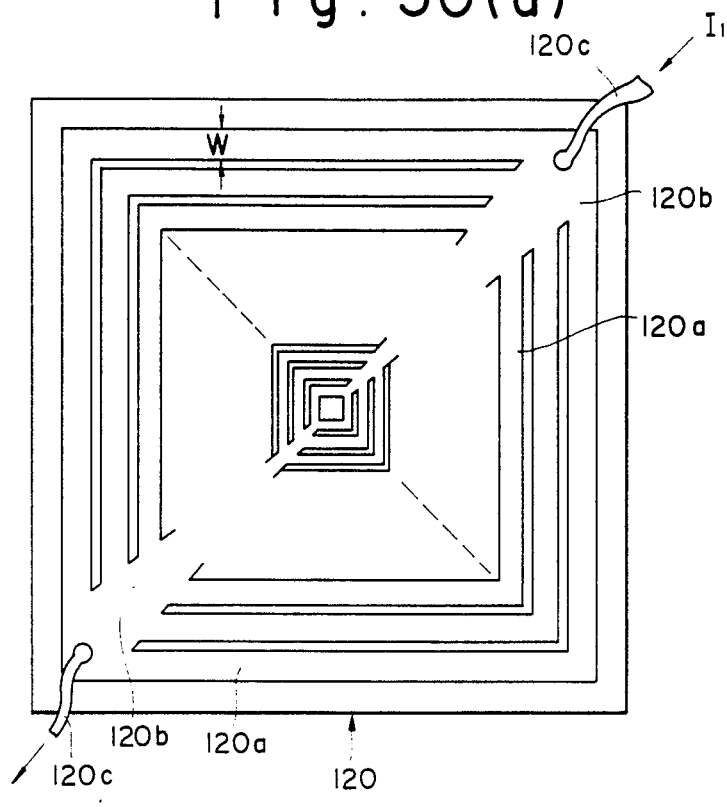
FIG. 30(a) is a schematic illustration showing the detailed structure of a plane coil so constructed to make the current flowing through each of the L-shaped strips of the plane coil equal in amount in accordance with one embodiment of the present invention.
Figure 30B:
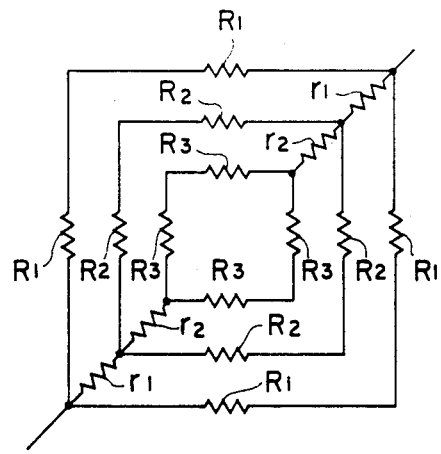
FIGS. 30(b) and (c) are equivalent circuit diagrams of the plane coil having three L-shaped strips on both sides of the diagonal strip to which all of the L-shaped strips are connected.

FIG. 30(a) shows a modification of the first plane coil 120, which is so structured to make the amount of Joule heat uniform across the first plane coil 120 by equalizing the magnitude of the driving current flowing through each of the angled or L-shaped strips 120a. In order to satisfy this condition, it is only necessary to determine the width of each of the strips 120a appropriately when all of the strips 120a are comprised of the same material. FIG. 30(b) shows an equivalent circuit of the first plane coil 120 when three L-shaped strips 120a are provided on one side of the diagonal strip 120b. The electrical resistance of each of the straight sections of the L-shaped strips 120a is indicated by subscripted R and the electrical resistance of that portion of the diagonal strip 120b between the two adjacent L-shaped strips 120a is indicated by subscripted r. As is well known in the art, such an electrical resistance R is defined as follows:

$$R = (\rho/t) \times (l/W) \qquad (54)$$

where,
 ρ: resistivity
 t: strip thickness
 W: strip width
 l: strip length .

It is to be noted that (ρ/t) is constant when the strips are all uniform in thickness, which is the case when the strips are formed by copper foils.

Figure 30C:
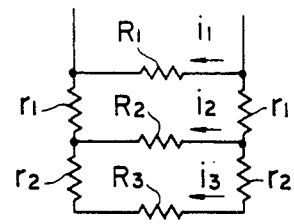

FIG. 30(c) illustrates a circuit diagram which is a simplified version of the circuit shown in FIG. 30(b). In the circuit of FIG. 30(c), in order to equalize the currents $i_1$, $i_2$ and $i_3$ flowing through the resistors $R_1$, $R_2$ and $R_3$, respectively, the following conditions must be met.

$$\left. \begin{array}{l} R_1 = R_2 + 4r_1 \\ R_2 = R_3 + 2r_2 \end{array} \right\} \qquad (55)$$

When the above arguments are generalized to the case including n number of L-shaped strips, the following conditions are obtained.

$$\left. \begin{array}{l} R_1 = R_2 + 2(n-1)r_1 \\ R_2 = R_3 + 2(n-2)r_2 \\ \quad \cdot \\ R_k = R_{k+1} + 2(n-k)r_k \\ \quad \cdot \\ R_{n-1} = R_n + 2r_{n-1} \end{array} \right\} \qquad (56)$$

With such a structure, the driving current flowing through each of the L-shaped strips can be made uniform. This also holds true for the third plane coils 122 of the second composite coil 63.

Figure 31A:
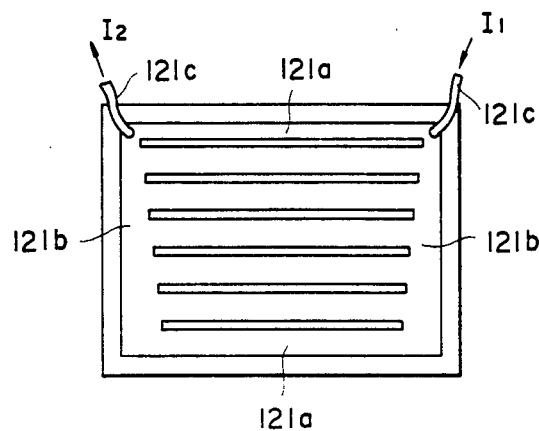
FIG. 31(a) is a schematic illustration showing the detailed structure of a plane coil so constructed to make the current flowing through each of the horizontal strips of the plane coil equal in amount in accordance with another embodiment of the present invention.

FIG. 31(a) illustrates the detailed structure of the second plane coil 121 of the first composite coil 62, which is so modified to make the current uniform in magnitude one horizontal strip 121a from another by suitably sizing each of the horizontal strips 121a, as will be described in detail below.

Figure 31B:
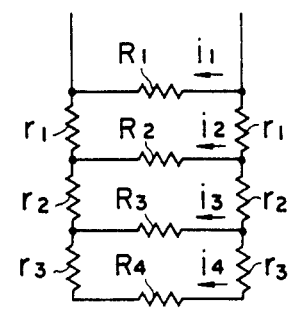
FIG. 31(b) is a equivalent circuit diagram of the plane coil having four horizontal strips which are connected on both ends as shown in FIG. 31(a)

FIG. 31(b) shows an equivalent circuit of the second plane coil 121 including four horizontal strips 121a, in which the electrical resistance of each of the horizontal strips 121a is indicated by subscripted R and the electrical resistance of each portion of the end strips 121b existing between the two adjacent horizontal strips is indicated by subscripted r. Thus, in order to make the currents $i_1$, $i_2$, $i_3$ and $i_4$ flowing through the resistors $R_1$, $R_2$, $R_3$ and $R_4$, respectively, uniform in magnitude, the following conditions are required.

$$\begin{array}{l} R_1 = R_2 + 6r_1 \\ R_2 = R_3 + 4r_2 \end{array} \qquad (57)$$

-continued
$$R_3 = R_4 + 2r_3$$

It is to be noted that the above arguments hold true for the fourth plane coil 123 of the second composite coil 63.

Figure 32:
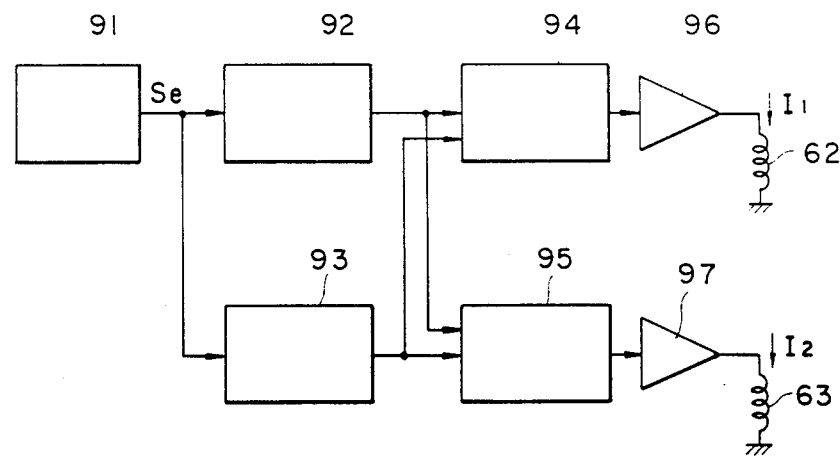
FIG. 32 is a block diagram showing the driving control circuit which may be used to control the operation of the two-layer composite coil including the first and second coil assemblies shown in FIGS. 25 and 26.

FIG. 32 shows in block diagram a driving control circuit which may be used to control the supply of current $I_1$, $I_2$ to the first and second composite coils 62 and 63 to control the position of the bobbin 61, or, in particular, the position of the lens 60 relative to the recording disc 1. The control circuit includes an error detecting sensor 91 which is connected to a focusing error detecting circuit 92 and also to a tracking error detecting circuit 93, both of which, in turn, are connected to first and second arithmetic circuits 94 and 95. The first arithmetic circuit 94 is connected to the coil 62 through a first servo-amplifier 96. Similarly, the second arithmetic circuit 95 is connected to the coil 63 through a second servo-amplifier 97. Therefore, the currents $I_1$ and $I_2$ to be supplied to the coils 62 and 63, respectively, are appropriately controlled depending upon the detected error signal Se so as to move the lens 60 for carrying out focusing and tracking controls.

Figure 33:
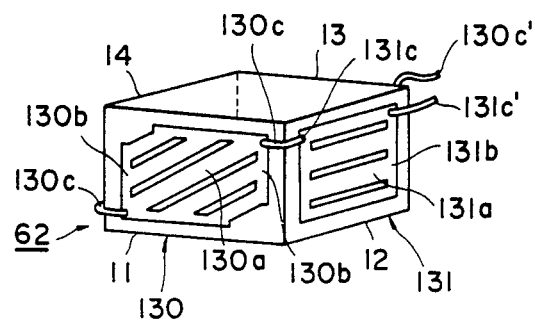
FIG. 33 is a perspective view showing another embodiment of the first coil assembly comprised of a pair of first plane coils and a pair of second plane coils for use in the present apparatus.

FIG. 33 shows another embodiment of the first composite coil 62 including a pair of first plane coils 130, 130 and a pair of second plane coils 131, 131. As shown, the first plane coil 130 includes a plurality of inclined strips 130a and two end strips 130b to which the ends of the inclined strips 130a are connected. It is to be noted that each of the end strips may have not only a vertical segment but also a horizontal segment, each of appropriate length, depending upon the number and/or shape of the inclined strips 130a so as to provide required electrical connection. The first plane coil 130 is also provided with a pair of leads 130c and 130c. On the other hand, the second plane coil 131 includes a plurality of horizontal strips 131a and a pair of vertical strips 131b and 131b to which the horizontal strips 131a are connected. The coil 131 is also provided with a pair of leads 131c and 131c'. Electrical connection among the four plane coils 130, 130, 131 and 131 is established in the manner similar to the previous embodiment.

Figure 34:
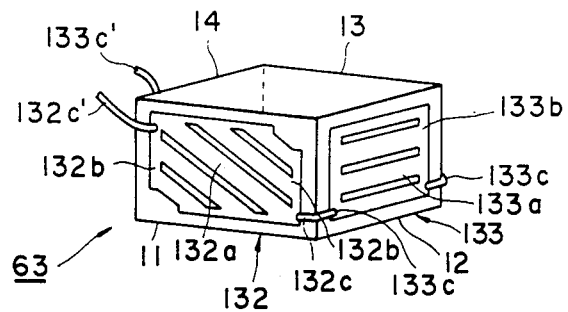
FIG. 34 is a perspective view showing another embodiment of the second coil assembly, comprised of a pair of third plane coils and a pair of fourth plane coils, to be used in the present apparatus together with the first coil assembly of FIG. 33.

FIG. 34 shows the second composite coil 63 to be used together with the first composite coil 62 of FIG. 33. As shown, the second composite coil 63 includes a pair of third plane coils 132 and 132 and a pair of fourth plane coils 133 and 133. The third plane coil 132 includes a plurality of inclined strips 132a and two end strips 132b and 132b. It is to be noted that the inclined strips 132a of the third plane coil 132 and the inclined strips 130a of the first plane coil 130 are inclined opposite in direction and symmetrical with respect to the center axis of the bobbin 61. The fourth plane coil 133 includes a plurality of horizontal strips 133a and two end trips 133b and 133b. Similarly with the previously described embodiment, the third and fourth plane coils 132 and 133 are also provided with leads such as 132c, 133c which are appropriately interconnected to have the four plane coils 132, 133 connected in series. The leads 130c' and 131c' of the first composite coil 62 and 132c' and 133c' of the second composite coil 63 are provided to supply driving current to the plane coils.

Figure 35A:
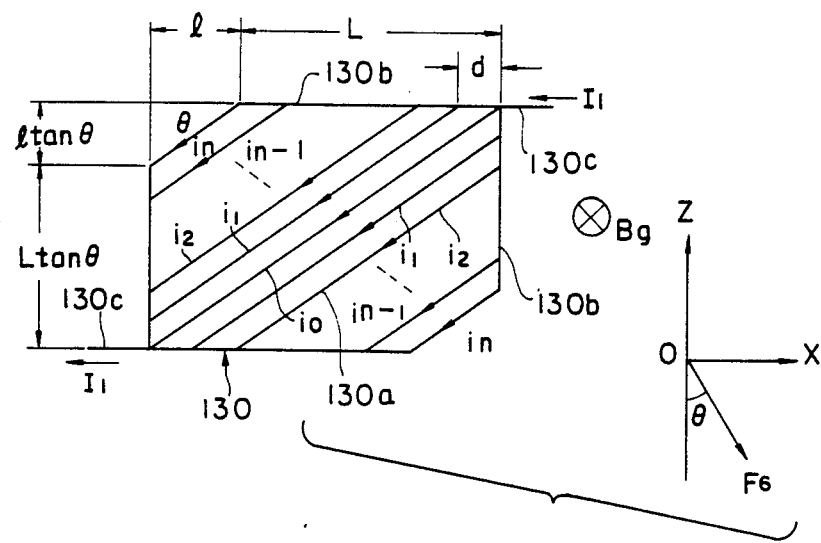
FIGS. 35(a) through (d) are schematics of the first plane coil of the first coil assembly which are useful for understanding the operation of the first plane coil shown in FIG. 33.

FIG. 35(a) illustrates the schematic of the first plane coil 130 disposed on the surface 11 of the bobbin 61, and it is assumed that the driving current $I_1$ is supplied as indicated. It is also assumed that the magnetic field has the strength $B_g$ ($Wb/m^2$) and the current components $i_0$, $i_1, i_2, \ldots, i_{n-1}$ and $i_n$ flowing through the respective inclined strips 130a are all uniform in magnitude. The spacing d between the inclined strips 130a measured in the direction of X axis is determined by $$D = L/N \tag{58}$$

where,

L: length of the end strip 130b in X axis direction, and
N: number of inclined strips 130a.

Figure 35B:
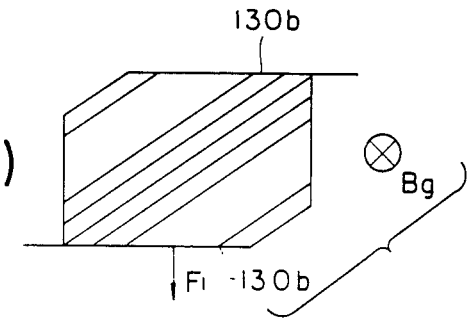

Referring to FIG. 35(b), the net force $F_1$ exerted to the horizontal (X axis) segments of the end strips 130b, 130b may be expressed as $$\begin{aligned} F_1 &= 2(B_g NID + B_g(N-1)ID + \ldots + B_g ID) \\ &= 2B_g ID(1 + \ldots + N) \\ &= B_g IL(N+1) \end{aligned} \tag{59}$$

where, $I = i_0 = i_1 = i_2 = \ldots = i_n$.

Figure 35C:
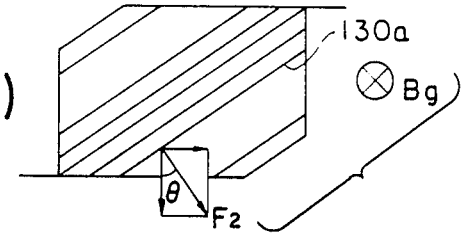
Figure 35D:
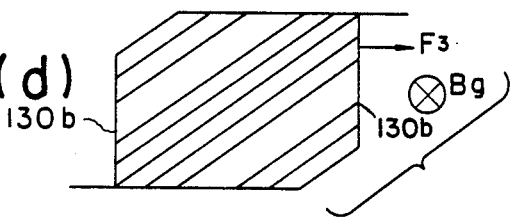

Then, referring to FIG. 35(c), the net force $F_2$ received by the inclined strips 130a may be obtained as follows:

$$\begin{aligned} F_2 &= B_g I((L+1)/\cos\theta) + 2(B_g I(1+L-D)/\cos\theta + \\ &\quad B_g I(1+L-2D)/\cos\theta + \ldots + B_g I(1/\cos\theta)) \\ &= (B_g I/\cos\theta) \times (L+1+2N(1+L) - 2D(1+2+\ldots+N)) \\ &= (B_g I/\cos\theta) \times ((1+L)(2N+1) - L(N+1)) \end{aligned} \tag{60}$$

where, l: length of the horizontal (X-axis) segment of the topmost inclined strip 130a, and θ: angle formed between the horizontal segment of the inclined strips 130a and the X-axis.

Furthermore, the force $F_3$ exerted to the vertical (Z-axis) segments of the end strips 130b and 130b may be expressed by $$F_3 = B_g IL(N+1)\tan\theta. \tag{61}$$

Under the conditions, the direction of the resultant force $F_4$ between the forces $F_1$ and $F_3$ may be determined by $$\tan\theta = F_3/F_1 \tag{62}$$

which is the same direction as that of $F_2$. Furthermore, the magnitude $F_5$ may be obtained from equations (59) and (61) as follows:

$$F_5 = \sqrt{F_1^2 + F_3^2} = (B_g I/\cos\theta)L(N+1). \tag{63}$$

Therefore, the net resultant force $F_6$ may be obtained from the equations (60) and (63) as follows:

$$\begin{aligned} F_6 &= F_2 + F_5 \\ &= (B_g I/\cos\theta)(2N+1)(1+L) \\ &= (B_g I_1/\cos\theta)(1+L) \end{aligned} \tag{64}$$

where, $I_1 = I(2N+1)$.

The X-axis component $F_{6X}$ and Z-axis component $F_{6Z}$ of the net resultant force $F_6$ are as follows:

$$\begin{aligned} F_{6X} &= F_6 \sin\theta = B_g I_1(1+L)\tan\theta, \text{ and} \\ F_{6Z} &= F_6 \cos\theta = B_g I_1(1+L). \end{aligned} \tag{65}$$

The equation (64) indicates that the net force obtained by supplying current $I_1$ is pointed in a predetermined direction and its magnitude is proportional to the value of the supplied current $I_1$.

Figure 36:
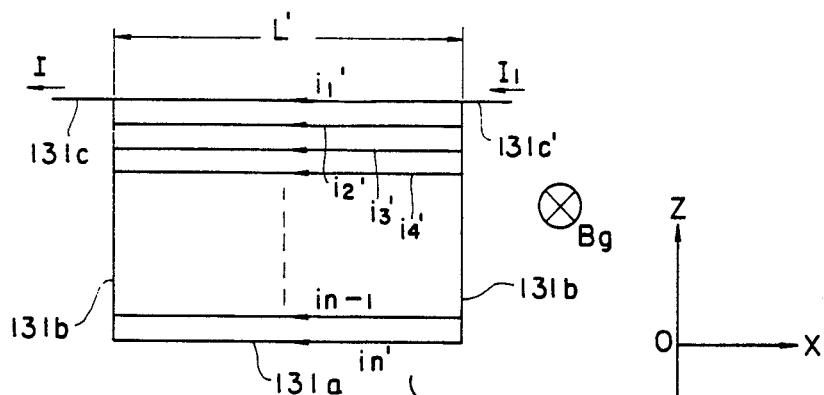
FIG. 36 is a schematic illustration of the second plane coil of the first coil assembly which is useful for understanding its operation.

FIG. 36 illustrates the second plane coil 131 disposed on the surface 12 of the bobbin 61. The net force received by the plane coil 131 may be obtained in a manner similar to the previous embodiment. Noting that the forces exerted on the vertical strips 131b and 131b on both ends of the coil 131 cancel out each other and assuming that all of the currents $i_1', i_2', \ldots, i_n'$ are same in magnitude, the net force received by the second plane coil 131 may be expressed as follows:

$$\begin{aligned} F_7 &= (\tfrac{1}{2})B_g i_1' L' + (\tfrac{1}{2})B_g i_2' L' + \ldots + (\tfrac{1}{2})B_g i_n' L' \\ &= (\tfrac{1}{2})B_g(i_1' + i_2' + \ldots + i_n')L' \\ &= (\tfrac{1}{2})B_g I_1 L' \end{aligned} \tag{66}$$

where, L': length of horizontal strips 131a, and $I_1 = i_1' + i_2' + \ldots + i_n'$.

As a result, the total force received by the first composite coil 62 including two first plane coils 130 and two second plane coils 131 is $2(F_6 + F_7)$.

Figure 37:
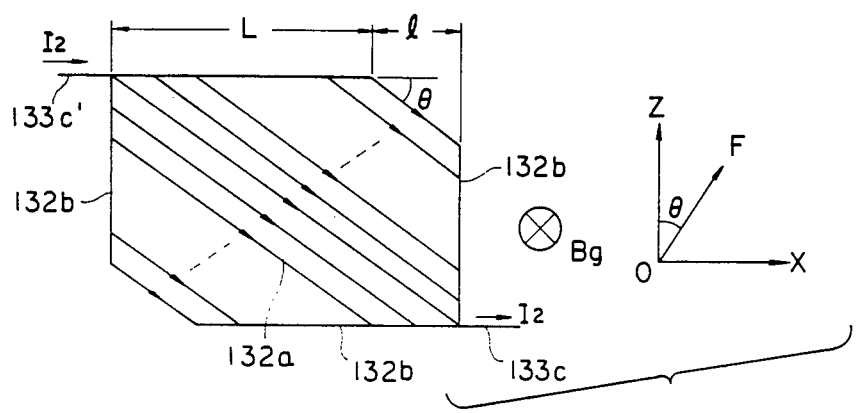
FIG. 37 is a schematic illustration of the third plane coil of the second coil assembly which is useful for understanding its operation.

FIG. 37 shows the schematic of the third plane coil 132 of the second composite coil 63. Following an analogous analysis described with respect to the first plane coil 131 of the first composite coil 62, the total force $F_8$ received by the third plane coil 132 may be expressed by the following equation (67) and it is directed at an angle θ from the Z-axis.

$$F_8 = (B_g I_2/\cos\theta)(1+L) \tag{67}$$

When the force $F_8$ is broken down to X-axis and Z-axis components $F_{8X}$ and $F_{8Z}$, they can be expressed as follows:

$$\left. \begin{aligned} F_{8X} &= F_8 \sin\theta = B_g I_2(1+L)\tan\theta, \text{ and} \\ F_{8Z} &= F_8 \cos\theta = B_g I_2(1+L) \end{aligned} \right\} \tag{68}$$

Figure 38:
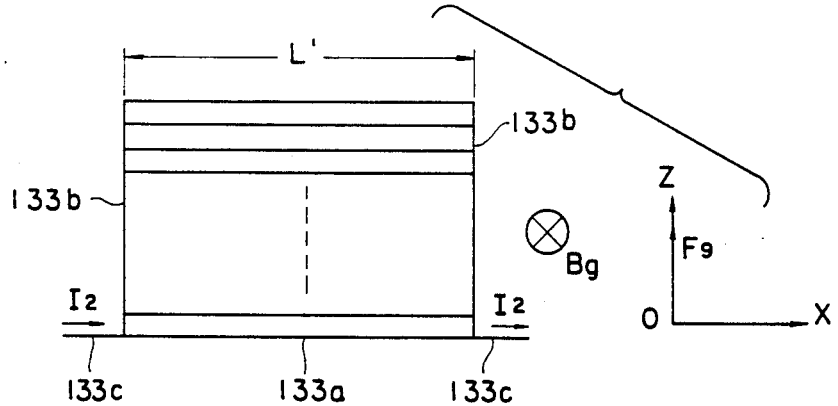
FIG. 38 is a schematic illustration of the fourth plane coil of the fourth coil assembly which is useful for understanding its operation.

Furthermore, the net force $F_9$ received by the fourth plane coil 133, as shown in FIG. 38, may be easily obtained by following the similar arguments described with respect to the second plane coil 131, and, thus, it may be given as $$F_9 = (\tfrac{1}{2})B_g I_2 L'. \tag{69}$$

As a result, the total force received by the second composite coil 63 having two third plane coils 132 and two fourth plane coils 133 becomes $2(F_8 + F_9)$.

From the above, denoting the total force in the tracking control direction by $F_X$ and the total force in the focusing control direction by $F_Z$, the following relations may be obtained from the equations (65), (66), (68) and (69).

$$\begin{aligned} F_X &= 2(F_{6X} + F_{8X}) \\ &= K_1(I_1 + I_2) \\ F_Z &= 2(-F_{6Z} + F_{8Z} - F_7 + F_9) \\ &= K_2(I_2 - I_1) \end{aligned} \tag{70}$$

where, $K_1 = 2B_g(1+L)\tan\theta$
$K_2 = B_g(2(1+L) + L')$.

The driving current for each of the first and second composite coils 62 and 63 may be obtained as shown below from the above relations (70).

$$I_1 = (\tfrac{1}{2})((F_X/K_1) - (F_Z/K_2)) \quad (71)$$
$$I_2 = (\tfrac{1}{2})((F_X/K_1) - (F_Z/K_2))$$

In the present embodiment, as apparent from the relations (70), if it is desired to move the bobbin 61 only in the tracking control direction (X-axis direction), it is only necessary to supply the driving currents to the first and second composite coils 62 and 63 to satisfy the condition $I_1 = I_2$. If it is desired to move the bobbin 61 only in the focusing control direction, driving currents should be supplied to the first and second composite coils 62 and 63 such that $I_1 = -I_2$.

Figure 39A:
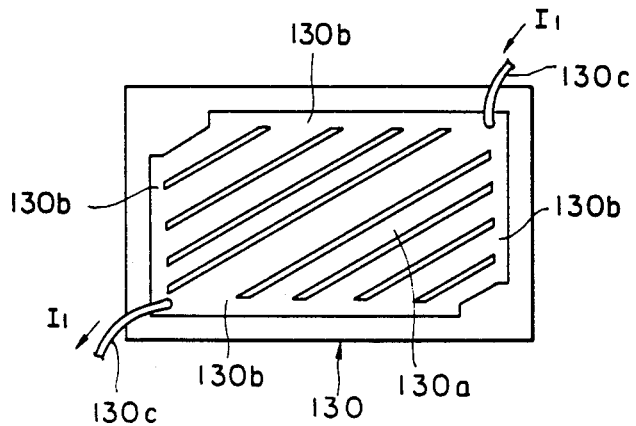
FIG. 39(a) is a front view showing another embodiment of the first plane coil which is so structured to make the current flowing through each of the oblique strips same in magnitude.
Figure 39B:
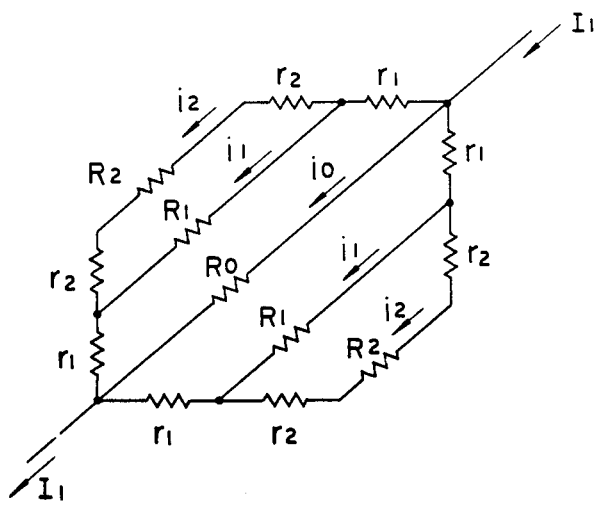
FIG. 39(b) is an equivalent circuit diagram of the first plane coil having five oblique strips.

FIGS. 39 and 40 show the detailed structures of the first and second plane coils 130 and 131 when the sizes of the strips, inclined 130a or horizontal 131a, are so constructed to make the currents $i_0, i_1, \ldots, i_n$, or $i_1', i_2', \ldots, i_n'$ carried by the respective strips 130a or 131a uniform in magnitude. In the illustrated example, the width of each of the strips is determined by using the equation (54) in a manner similar to the previous example. Accordingly, the conditions to be met for making the currents $i_0$, $i_1$ and $i_2$ identical in value in the equivalent circuit of FIG. 39(b) including five inclined strips are as follows:

$$\left. \begin{array}{l} R_1 = R_0\, 2r_1, \text{ and} \\ R_2 = R_1 - 2r_2. \end{array} \right\} \quad (72)$$

Generalization of the conditions (72) for making the currents $i_0, i_1, i_2, \ldots, i_n$ identical in magnitude for the n number of inclined strips gives the following conditions.

$$\left. \begin{array}{l} R_1 = R_0 - 2r_1 \\ R_2 = R_1 - 2r_2 \\ \vdots \\ R_k = R_{k-1}\, 2r_{k-1}(n - k + 1) \\ \vdots \\ R_n = R_{n-1} - 2r_{n-1} \end{array} \right\} \quad (73)$$

Figure 40A:
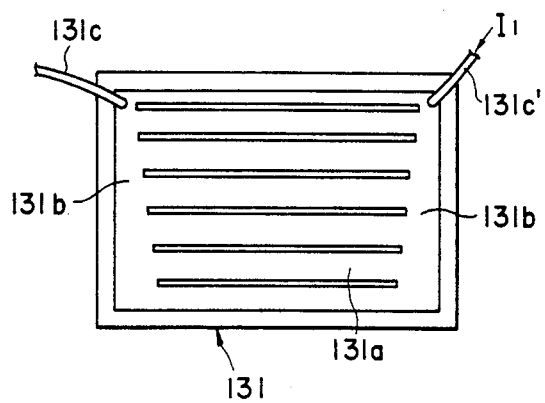
FIG. 40(a) is a front view showing another embodiment of the second plane coil which is so structured to make the current flowing through each of the horizontal strips same in magnitude.
Figure 40B:
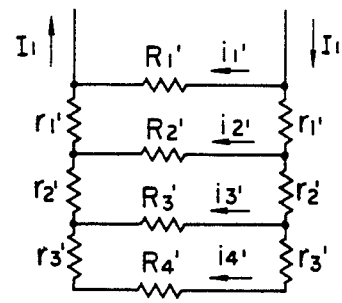
FIG. 40(b) is an equivalent circuit diagram of the second plane coil having four horizontal strips.

On the other hand, FIG. 40(a) shows the second plane coil 131 which is so constructed to make the current carried by each of the horizontal strips 131a same in magnitude. FIG. 40(b) shows an equivalent circuit of the second plane coil 131 having four horizontal strips which are indicated by resistors $R_1'$ through $R_4'$. In order to make the currents $i_1', i_2', i_3'$, and $i_4'$ same in magnitude, the following conditions must be met.

$$\left. \begin{array}{l} R_1' = R_2' + 2r_1' \\ R_2' = R_3' + 2r_2' \\ R_3' = R_4' + 2r_3' \end{array} \right\} \quad (74)$$

When the conditions (74) are generalized to the case of n number of horizontal strips 131a, we have $$\left. \begin{array}{l} R_1' = R_2' + 2(n-1)r_1' \\ R_2' = R_3' + 2(n-1)r_2' \\ \vdots \\ R_k' = R_{k+1}' + 2(n-k)r_k' \\ \vdots \\ R_{n-1}' = R_n' + 2r_{n-1}'. \end{array} \right\} \quad (75)$$

Figure 41:
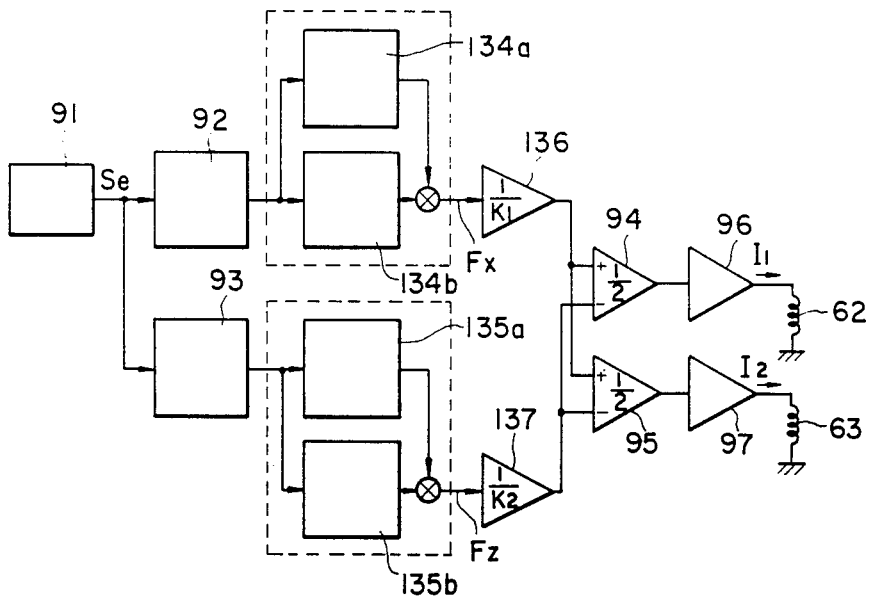
FIG. 41 is a block diagram of the driving control circuit for controlling the operation of the apparatus including the first and second coil assemblies shown in FIGS. 33 and 34.

FIG. 41 shows in block diagram a driving control circuit which may be advantageously used to supply driving currents $I_1$ and $I_2$ to the first and second composite coils 62 and 63 shown in FIGS. 33 and 34 to control the position of the bobbin 61 or the lens 60 with respect to the recording disc 1. Since this circuit is substantially the same in structure as that of FIG. 32, identical numerals are used to indicate identical elements. The circuit of FIG. 41 additionally includes differentiating circuits 134a and 135a and phase compensating circuits 134b and 135b for stabilization of the control system, as in the case of the driving control circuit shown in FIG. 17.

Figure 42:
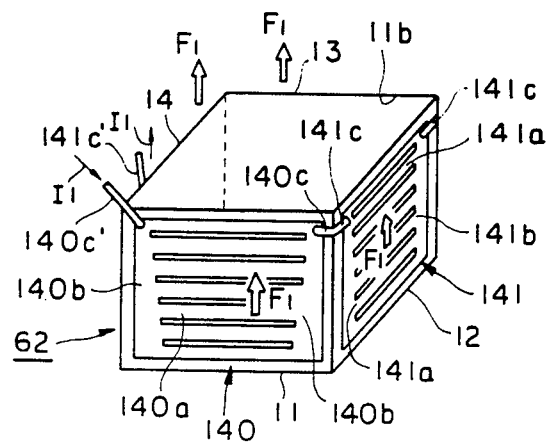
FIG. 42 is a perspective view showing a further embodiment of the first coil assembly including a pair of first plane coils and another pair of second plane coils.
Figure 43:
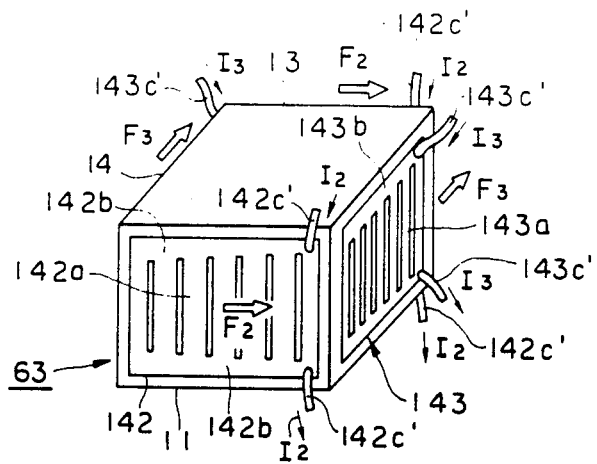
FIG. 43 is a perspective view showing a further embodiment of the second coil assembly including a pair of third plane coils and another pair of fourth plane coils.

FIGS. 42 and 43 show another embodiment of a set of first and second composite coils 62 and 63 constructed in accordance with the present invention. As shown, the first composite coil 62 shown in FIG. 42 includes a pair of first plane coils 140, 140 to be disposed on the surfaces 11 and 13 of the bobbin 61 and another pair of second plane coils 141, 141 to be disposed on the surfaces 12 and 14 of the bobbin 61. Each of the first plane coils 140, 140 includes a plurality of horizontal strips 140a and a pair of vertical end strips 140b, 140b to which both ends of each of the horizontal strips 140a are connected. Each of the second plane coils 141, 141 is similarly constructed and it includes a plurality of horizontal strips 141a and a pair of vertical end strips 141b, 141b. These first and second plane coils are serially connected via opposite leads such as 140c and 141c excepting two leads 140c' and 141c' which are connected to a driving control circuit.

FIG. 43 shows the second composite coil 63 to be formed on the first composite coil 62 as electrically insulated therefrom. As shown, the second composite coil 63 includes a pair of third plane coils 142, 142 and another pair of fourth plane coils 143, 143, all of which are similarly constructed. Each of the third plane coils 142 includes a plurality of vertical strips 142a and a pair of horizontal end strips 142b; on the other hand, each of the fourth plane coils 143 includes a plurality of vertical strips 143a and a pair of horizontal end strips 143b. It is to be noted that each of the third and fourth plane coils 142 and 143 is provided with a pair of leads 142c', 142c' and 143c', 143c', respectively, and these leads are not connected to each other and instead connected to a driving control circuit. Thus, each of the third and fourth plane coils 142 and 143 receives the driving current independently from one another.

Figure 44:
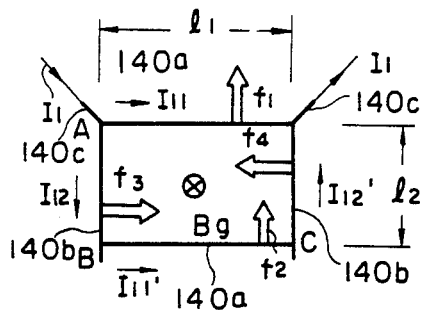
FIG. 44 is a schematic illustration of the first plane coil of the first coil assembly shown in FIG. 42 useful for understanding its operation.

FIG. 44 is a schematic of a portion of one of the first plane coil 140 showing an electric circuit formed by a pair of horizontal strips 140a and 140a and the vertical end strips 140b and 140b. When current $I_1$ is supplied through the lead 140c, it is divided into $I_{11}$, which flows along the path A-D, and $I_{12}$, which flows along the path A-B. In this manner, divided current $I_{11}'$ flows along the path B-C, and the other current component $I_{12}'$ flows along the path D-C. As indicated, the paths A-D and B-C are both $l_1$ and the paths A-B and D-C are both $l_2$. The divided current components are again combined at point D into $I_1$, which then flows out through the other lead 140c. Under the conditions, each of the paths A-D, B-C, A-B and C-D receives the following forces $f_1$, $f_2$, $f_3$ and $f_4$, respectively.

$$f_1 = B_g I_{11} l_1 \tag{76}$$

$$f_2 = B_g I_{11}' l_1 \tag{77}$$

$$f_3 = B_g I_{12} l_2 \tag{78}$$

$$f_4 = B_g I_{12}' l_2 \tag{79}$$

Since it may be assumed that $I_{12} = I_{12}'$ and thus the forces $f_3$ and $f_4$ are same in magnitude and opposite in direction, these forces $f_3$ and $f_4$ cancel out. Thus, the resultant force $F_1'$ applied to the first plane coil 140 as a whole as a result of the current flow may be expressed as follows:

$$F_1' = f_1 + f_2 = B_g(I_{11} + I_{11}') l_1. \tag{80}$$

As indicated in FIG. 44, this force $F_1'$ is pointed upward, i.e., in the direction perpendicular to the longitudinal direction of the horizontal strips 140a.

It will thus be understood that by supplying current $I_1$, $I_2$ and $I_3$ to each of the plane coils 140, 141, 142 and 143, as indicated in FIGS. 42 and 43, the surfaces 11 and 13 of the bobbin 61 receive the force $F_1$ directed in parallel with Z-axis and the force $F_2$ directed in parallel with X-axis; whereas, the surfaces 12 and 14 of the bobbin 61 receive the force $F_1$ and the force $F_3$ directed in parallel with the Y-axis. Reversal in the direction of the currents will cause these forces reversed in direction. The forces $F_1$, $F_2$ and $F_3$ will be easily derived from the discussions so far described in detail with respect to the other embodiments in the above. This embodiment is advantageous in a sense because all of the strips are straight and thus easy to manufacture.

Figure 45A:
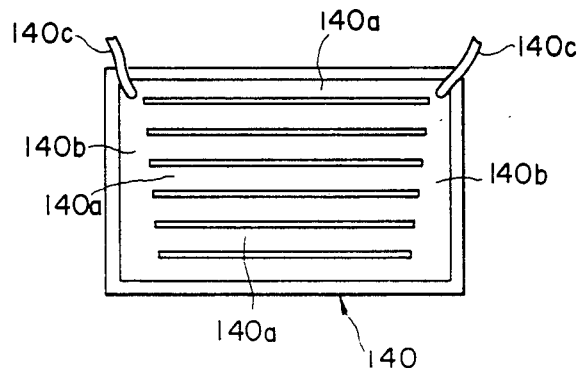
FIG. 45(a) is a front view showing another embodiment of the first plane coil of the first coil assembly shown in FIG. 42 which is so structured to make the current flowing through each of the horizontal strips uniform in magnitude.
Figure 45B:
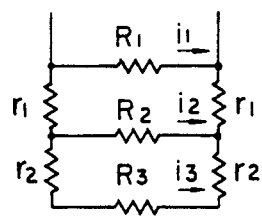
FIG. 45(b) is an equivalent circuit diagram of the first plane coil of FIG. 45(a) having three horizontal strips.

FIGS. 45(a) and (b) illustrate a modification of the plane coil 140 which is so structured that all of the horizontal strips 140a carry the same amount of current thereby avoiding the occurrence of localized or non-uniform heat production across the coil 140. FIG. 45(b) is an equivalent circuit of the plane coil 140 having only three strips 140a, which are indicated as resistors $R_1$-$R_3$. As discussed in detail with respect to the other embodiments in the above, the width of each of the strips 140a must be so selected to satisfy the below-mentioned conditions in order to make the current components $i_1$, $i_2$ and $i_3$ same in magnitude.

$$\begin{aligned} R_1 &= R_2 + 4r_1, \text{ and} \\ R_2 &= R_3 + 2r_2. \end{aligned} \tag{81}$$

Figure 46:
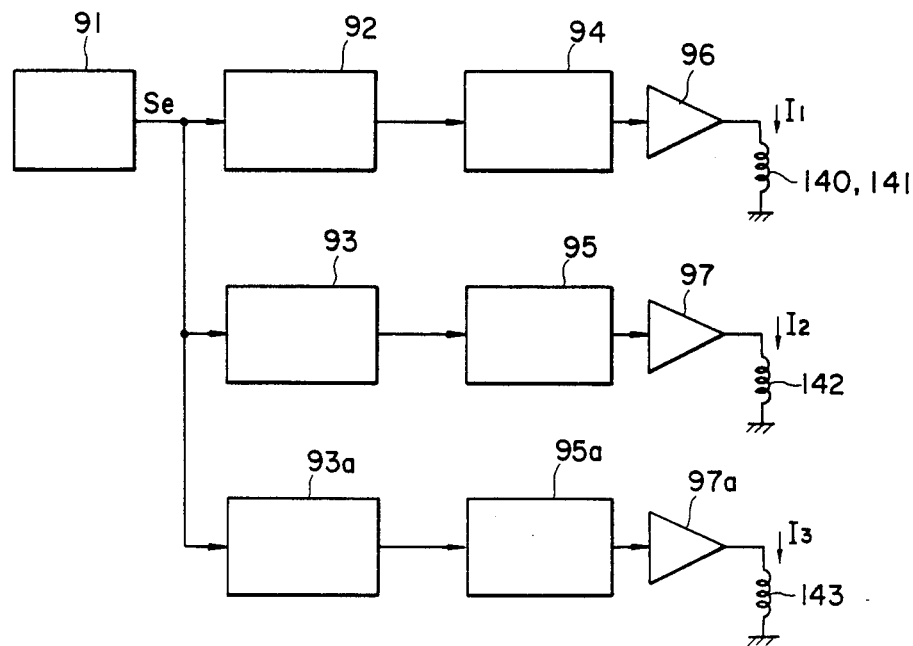
FIG. 46 is a block diagram of the driving control circuit for controlling the supply of driving current to the first and second coil assemblies shown in FIGS. 42 and 43.
Figure 47:
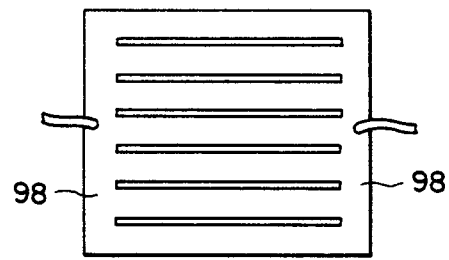
FIG. 47 is a front view showing another embodiment of a plane coil to be used in any of the composite coil structures.

FIG. 46 shows in block diagram a driving control circuit to be used in the present embodiment including the first and second composite coils 62 and 63, which are shown in FIGS. 42 and 43, respectively. Since this driving control circuit is similar in structure as well as in operation to those described previously with respect to other embodiments of the present invention, its detailed explanation is omitted. However, the circuit includes the error detecting sensor 91, focusing error detecting circuit 92, tracking error detecting circuit 93, time axis error detecting circuit 93a arithmetic circuits 94, 95 and 95a, servo-amplifiers 96, 97 and 97a and plane coils 140, 141, 142 and 143, as shown. FIG. 47 illustrates a further modification of the plane coil which may be used in the present optical recording and/or reading apparatus, and in this embodiment, leads are connected to the center of the vertical end strips as different from the previous embodiments in which a lead is connected to one end of the end strip.

While the above provides a full and complete disclosure of the preferred embodiments of the present invention, various modifications, alternate constructions and equivalents may be employed without departing from the true spirit and scope of the invention. For example, the bobbin 61 may include additional elements such as a light source including a light emitting diode and any other well-known optical elements, in which case the whole apparatus may be made further compact in size. Therefore, the above description and illustration should not be construed as limiting the scope of the invention, which is defined by the appended claims.

What is claimed is:

1. An optical positioning device for positioning an optical lens unit relative to information recording tracks on an optical recording surface comprising:
    a body case having a vertical passageway with a central vertical axis;
    a bobbin moveably disposed in said vertical passageway and supporting said optical lens unit, and having a vertical hollow defined therein; top and bottom support members resiliently connecting respective top and bottom portions of the bobbin to wall portion of the vertical pasageway so that said bobbin can move in both a vertical direction and a horizontal direction;
    a first coil wound around a vertical axis of said bobbin;
    a second coil would around a horizontal axis of said bobbin and circumscribing the bobbin in a vertical plane near the central vertical axis of the vertical passageway;
    magnetic field generating means including an inner portion located in the hollow of said bobbin and an outer portion located outside said bobbin, said inner and outer portions defining a magnetic flux gap whose magnetic flux intersects both first and second coils so that the bobbin moves in said vertical direction when current is passed through the first coil and in said horizontal direction when current is passed through the second coil.

2. A positioning device according to claim 1 wherein said vertical passageway, said bobbin and said magnetic generating means have circular cross sections in a common horizontal plane.

3. A positiing device according to claim 1 wherein said magnetic field includes a permanent magnet having a ring shape.

4. A device according to claim 3 wherein said inner and outer portions are ring shaped yokes.

5. A device according to claim 1 wherein said first and second coils are substantially perpendicular to each other.

6. A device according to claim 1 further comprising a control circuit for supplying control currents to said first and second coils so that the optical lens unit is properly positioned relative to said information recording tracks.

* * * * *